United States Patent [19]

Takahashi

[11] Patent Number: 5,239,381
[45] Date of Patent: Aug. 24, 1993

[54] APPARATUS FOR RECORDING AND REPRODUCING A PLURALITY OF TELEVISION SIGNALS OF DIFFERENT SYSTEMS

[75] Inventor: Hiroaki Takahashi, Yokohama, Japan

[73] Assignee: Hitachi, Ltd., Tokyo, Japan

[21] Appl. No.: 578,331

[22] Filed: Sep. 6, 1990

[30] Foreign Application Priority Data

Sep. 14, 1989 [JP] Japan .................................. 1-237028

[51] Int. Cl.⁵ .......................... H04N 5/76; H04N 5/782
[52] U.S. Cl. ...................................... 358/335; 358/310; 360/9.1; 360/33.1
[58] Field of Search ............... 358/310, 335, 337, 139, 358/140; 360/9.1, 33.1, 35.1, 37.1

[56] References Cited

U.S. PATENT DOCUMENTS

| | | | |
|---|---|---|---|
| 4,283,736 | 8/1981 | Morio et al. ................... | 380/33.1 |
| 4,500,930 | 2/1985 | Hamalainen et al. ........... | 358/310 |
| 4,520,401 | 5/1985 | Takahashi et al. .............. | 358/310 |
| 4,730,222 | 3/1988 | Schauffele ...................... | 358/310 |
| 4,757,390 | 7/1988 | Mehrgardt et al. .............. | 358/310 |
| 4,963,991 | 10/1990 | Honjo ............................... | 358/335 |
| 4,984,094 | 1/1991 | Fmori .............................. | 358/335 |

FOREIGN PATENT DOCUMENTS 2536935 6/1984 France .
1412091 10/1975 United Kingdom .

Primary Examiner—Tommy Chin
Assistant Examiner—Huy Nguyen
Attorney, Agent, or Firm—Antonelli, Terry Stout & Kraus

[57] ABSTRACT

A video signal recording and reproducing apparatus in which video signals based on a plurality of television systems in which the numbers of scanning lines and the frame frequencies are different are recorded by the same VTR. The numbers of effective pixels in one horizontal scanning period and the numbers of effective scanning lines per frame which are based on the respective television systems are made coincident. Only the effective scanning lines are recorded. The rotational speed of the cylinder is also changed in proportion to the frame frequency and tape patterns are made coincident for the respective television systems.

6 Claims, 18 Drawing Sheets

1125/60  4 SEGMENT RECORDING

1250/50  4 SEGMENT RECORDING

FIG. 10

| | LUMINANCE SIGNAL SAMPLING FREQUENCY $f_{SY}$ | CHROMINANCE SIGNAL SAMPLING FREQUENCY $f_{SC}$ | TDM SIGNAL SAMPLING FREQUENCY $f_T$ |
|---|---|---|---|
| 1125/60 SYSTEM | 48.6 MHz | 16.2 MHz | 58.75 MHz |
| 1250/50 SYSTEM | 45.0 MHz | 15.0 MHz | 48.97 MHz |
| RATIO | 1.08 : 1 | 1.08 : 1 | 1.2 : 1 |

1

APPARATUS FOR RECORDING AND REPRODUCING A PLURALITY OF TELEVISION SIGNALS OF DIFFERENT SYSTEMS

BACKGROUND OF THE INVENTION

The present invention relates to an apparatus for recording and reproducing a video signal by using rotary heads and, more particularly, to a video signal recording and reproducing apparatus which is suitable to record video signals based on a plurality of TV systems of different field frequencies.

The existing TV system is classified into three systems of NTSC, PAL, and SECAM. To record video signals in which field frequencies, the number of scanning lines per frame, and the like differ, for instance, in the home-use VTR, by changing a rotational speed of the rotary heads in accordance with the field frequency, a VTR suitable for each of the TV systems is realized as shown in "A Cassette VTR for Magnetic Recording and its Cassette (VHS system)", EIAJ, Technical Standard, CPZ 204, 1987.

SUMMARY OF THE INVENTION

Problems of the conventional techniques will now be described with respect to the above VHS system VTR as an example.

As is well known, the VHS system is an apparatus in which by using two heads attached to a rotary cylinder having a diameter of 62 mm with an opposite angle of 180°, a video signal is recorded by the helical scanning method onto a magnetic tape wrapped around the rotary cylinder with a wrap angle of about 180°. A rotational speed of the cylinder coincides with a frame frequency of the video signal to be recorded and is set to 30 Hz (r/s) in the case of the NTSC system and to 25 Hz (r/s) in the case of the PAL system. Therefore, the signal of one field is recorded by the single scanning operation of the head. As the number of scanning lines, the information of 525/2 scanning lines is written onto one track in the case of the NTSC system and the information of 625/2 scanning lines is written onto one track in the case of the PAL system.

In the actual recording process, the video signal is frequency modulated and, thereafter, it is recorded onto the tape. In the VHS system, carrier frequencies of signal levels of a sync tip (synchronization front edge) and a white peak (100% white) of the video signal are specified and are set to 3.4 MHz and 4.4 MHz in the case of the NTSC and to 3.8 MHz and 4.8 MHz in the case of the PAL. On the other hand, as mentioned above, the rotational speeds of the cylinder in the respective TV systems differ, so that the relative speed (scanning speed of the heads) between the tape and the heads is set to about 5.8 m/sec for the NTSC and to about 4.8 m/sec for the PAL. Therefore, when an attention is paid to a recording wavelength, the sync tip is set to 1.7 μm and the white peak is set to 0.7 μm for the NTSC and the sync tip is set to 1.3 μm and the white peak is set to 1 μm for the PAL.

As mentioned above, in the VHS system, in order to cope with different TV systems, it is possible to construct a system in which by changing the rotational speed of the cylinder in accordance with the field frequency, the signals based on different TV systems are recorded by the same mechanism. However, in the VHS system, the recording signal of the PAL must be shifted to the short wavelength side for the NTSC, so that there is a problem such that the S/N ratio of the reproduction signal of the PAL is inferior to that of the NTSC.

As mentioned above, the problem such that the qualities of the reproduction signals differ depending on the TV systems is generally applied to a video signal recording and reproducing apparatus associated with the rotational scanner. Such a problem is also common to what is called high definition TV, which will be put into practical use in future.

The various high definition TVs which have been proposed at present are mainly classified into three types. The first type relates to a Hi-Vision system which was mainly developed by NHK (Japan Broadcasting Corporation) of Japan and the field frequency is set to 60 Hz and the number of scanning lines is set to 1125 lines/frame. The second type relates to a system which has been proposed by several organizations U.S.A. and has been developed by paying an importance to the compatibility with the existing TV system. The ACTV (Advanced Compatible Television) system which has been proposed by NBC/D. Sarnoff Res. Ctr. can be mentioned as a typical system. According to the ACTV system, the field frequency is set to 59.94 Hz and the number of scanning lines is set to 1050 lines/frame, which is twice as large as the number of scanning lines of the existing NTSC system. The third type relates to a system called an HD-MAC which has been being developed cooperatively by countries in Europe. According to the HD-MAC system, the field frequency is set to 50 Hz and the number of scanning lines is set to 1250 lines/frame, which is twice as large as the number of scanning lines of the existing PAL system.

Similarly to the above-mentioned problem in the existing VHS system, in recording the video signals based on the high definition TV systems having various different field frequencies and the numbers of scanning lines as mention above, there is a problem such that since the recording wavelengths differ due to the difference of the systems, a difference is caused in the qualities of the reproduction video signals. There is a possibility such that the above problem will become a large problem in future for the high definition TV which intends to improve the picture quality.

On the other hand, in the case where various TV systems as described above exist even for the high definition TV, even in the VTR to record their video signals, there is also considered a situation such that the specifications of the hardware such as mechanism, circuit, and the like of the VTRs also differ due to the difference of the field frequencies and the numbers of scanning lines and the VTRs of various systems will be put into the market in the future. Particularly, with respect to the VTR for the high definition TV, as compared with the conventional VTR for the TV, signal processes are complicated and the scale of the hardware is also large in association with the complicated signal processes. If the VTRs of various systems are put into the market, not only will the market be confused but also it will be a large burden to the develop the VTRs of different systems mentioned above. On the other hand, the development of the VTR which can cope with such individual systems results in an increase in costs per apparatus and is very disadvantageous to both the developing side and the user side who will buy such an apparatus. As means of solving the above problems, in the VTRs for recording TV signals of different systems, there is considered a method whereby the recording methods or signal processing methods in those VTRs are made common to thereby make the hardware such as parts, circuits, and the like as common as possible. However, in the conventional VTRs, as represented by the home-use VTRs, there is used a method in which the input video signal is directly recorded without executing a signal process on the time base. Therefore, the difference of the systems of the input video signals directly results in the difference of the signal processing circuits and, in the present situation, it is difficult to realize the common hardware as mentioned above.

As mentioned above, in the recording system represented by the conventional home-use VTR, that is, the system in which the input video signal is directly recorded without executing the signal process on the time base, the signal processes in the VTRs and the recording patterns on the tape are quite different due to the difference of the systems of the input video signals. Thus, the reproduction picture quality is not constant due to the input video signal and the signal processing circuits of the VTRs also differ in correspondence to the input video signals. Consequently, there is a problem such that a burden on the hardware increases.

The above problem is more typical in the VTR for the high definition TV in which a higher picture quality is required and a hardware scale is larger than that of the conventional VTR. A countermeasure to solve the problem is demanded.

In consideration of the above problems, it is an object of the invention to provide a recording method of a video signal and its apparatus, wherein in the case of recording video signals of different systems, hardware such as a mechanism, a signal processing circuit, and the like are constructed, as possible, so that a decrease in cost per apparatus is realized and even for the video signals of different systems, their reproduction picture qualities can be made almost constant.

To accomplish the above object, upon recording video signals of different field frequencies and different numbers of scanning lines, the numbers of effective lines which are recorded by a VTR per frame of the video signals of different systems are set to the same number and, further, the numbers of samples per line, that is, the numbers of pixels are also made coincident and the video signals are recorded onto a magnetic tape. On the other hand, at this time, the relative speed between the magnetic tape and the heads is changed in accordance with the field frequency or frame frequency and a signal frequency for recording is properly changed in accordance with the system so as to make, for instance, the recording wavelength of the signal of a predetermined level almost constant in accordance with the relative speed, thereby making constant the format of the signal to be recorded onto the magnetic tape irrespective of the system of the input video signal and thereby enabling the almost equal picture quality to be obtained.

If the recording method as mentioned above is used, the number of effective lines which are recorded onto the magnetic tape and the number of pixels can be made constant irrespective of the system of the input video signal, most of the portions of a digital signal processing circuit to record and reproduce the video signal can be made common, and the VTR mechanism system can be made common. Therefore, not only the development period of time of the system can be reduced but also a large effect to reduce the cost of the hardware can be obtained. On the other hand, the signal format (the number of lines, structures of chrominance signals and a luminance signal on one line, and the like) on one track which is recorded by one scan on the magnetic tape of the rotary heads becomes constant irrespective of the system, so that it is possible to obtain an effect such that the picture quality by the reproduced video signal can be also always made constant irrespective of the system.

BRIEF DESCRIPTION OF THE DRAWINGS

FIG. 10 is a diagram showing a sampling frequency of each system;

DESCRIPTION OF THE PREFERRED EMBODIMENTS

An embodiment of the present invention will be described in detail hereinbelow with reference to the drawings.

Figure 1:
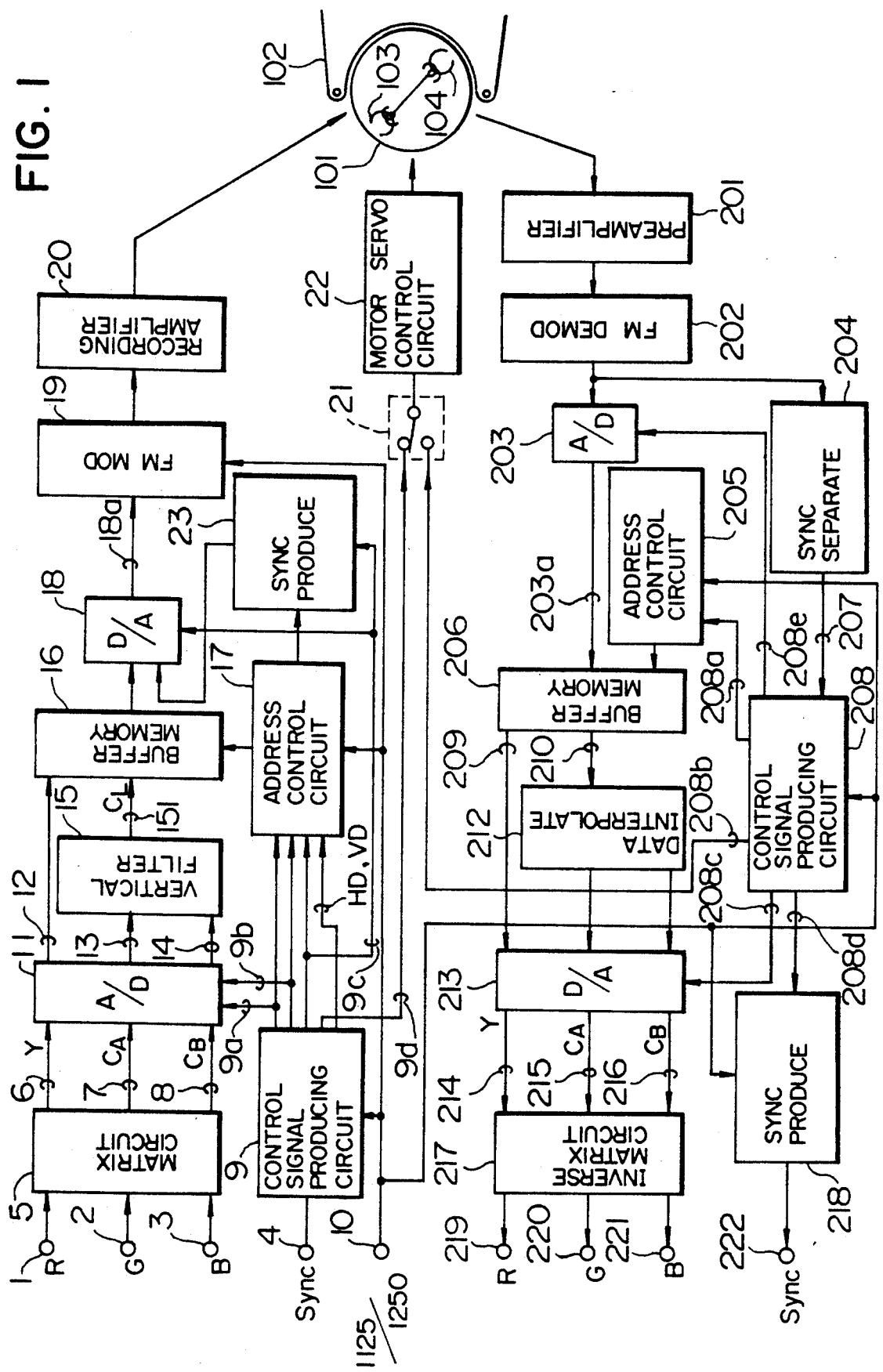
FIG. 1 is a block diagram of a VTR as an embodiment of the present invention.

FIG. 1 is a block diagram of a VTR showing an embodiment of the invention. In FIG. 1, a signal which is input to the VTR is what is called a high definition TV signal which is used in place of the signal of the existing television (TV) system such as NTSC, PAL, or the like. As such a high definition TV signal, the following signals have been proposed at present or have already been put into practical use. That is, there are a signal of the 1125/60 system having a denomination of Hi-Vision in which the number of scanning lines is set to 1125 and the field frequency is set to 60 Hz (frame frequency is set to 30 Hz), a signal of the 1250/50 system in which the number of scanning lines is set to 1250 and the field frequency is set to 50 Hz (frame frequency is set to 25 Hz), and the like. The VTR shown in FIG. 1 is constructed in a manner such that video signals of a plurality of systems of different numbers of scanning lines and different field frequencies are input, the same mechanism is used, the most of video signal processing circuit is commonly used, and the video signals of different systems can be recorded.

In the high definition TV, the video signals are generally transmitted and received by four kinds of signals comprising three primary color signals of R (red), G (green), and B (blue) and a sync signal. In general, in the case of directly recording the video signals of different systems as mentioned above to the VTR, since the rotational speeds of the cylinder, the numbers of scanning lines which are recorded onto one track, and the like are quite different, a dedicated signal processing circuit according to each system is also needed. On the other hand, the recording patterns on the magnetic tape are also quite different due to the system.

In the embodiment, as shown in FIG. 1, there is provided an input terminal 10 of a signal indicative of the system of the input video signal. For instance, when the input signal is based on the 1125/60 system, the signal of the logic level of "1" (H level) is input from the input terminal 10. In the case of the 1250/50 system, the signal of the logic level of "0" (L level) is input from the input terminal 10. With respect to the input signal from the input terminal 10, there is provided a circuit for detecting the field frequency of the input video signal and eventually automatically discriminating the system of the input video signal and outputting a control signal. The output of the control signal is supplied to the terminal 10. Further, in the VTR or the like of the type using a tape cassette, it is also possible to construct it in a manner such that a recognition hole to discriminate the system of the recording video signal is formed in the cassette and the system of the video signal is discriminated by means for discriminating a state of the recognition hole. In particular, the above construction is suitable to discriminate the system of the video signal which has previously been recorded upon reproduction. The system discrimination signal to set the system which was input from the terminal 10 as mentioned above is supplied to control signal producing circuits 9 and 208, address control circuits 17 and 205, and a frequency modulating circuit 19 as shown in FIG. 1. In order to execute the operations based on the system of the video signal which was input to the VTR or the system of the video signal recorded on the tape, circuit constants, various set values, and the like of the circuits to which the system discrimination signal was supplied are switched and the circuits execute predetermined operations.

In the embodiment, explanation will now be made with respect to the VTR in which two kinds of video signals of different systems are recorded by the same VTR mechanism and signal processing circuit, namely, what is called a dual mode VTR. However, the invention is not applied to only such a dual mode VTR. Even in an individual VTR corresponding to each system, the invention can be also applied to the case where the structures of the mechanisms and the types of the signal processing circuits are the same or similar types.

In FIG. 1, reference numerals 1, 2, 3, and 4 denote input terminals of the R, G, B, and sync signals. The three primary color signals of R, G, and B which were input from the terminal 1, 2, and 3 are processed by a matrix circuit 5 and converted into a luminance signal Y and two kinds of chrominance signals $C_A$ and $C_B$. On the other hand, the sync signal which was input from the terminal 4 is supplied to the control signal producing circuit 9. On the basis of the input sync signal, the control signal producing circuit 9 produces control signals 9a, 9b, 9c, and 9d of the respective sections. The signals of Y, $C_A$, and $C_B$ which were output from the matrix circuit 5 are supplied to an A/D converter 11, by which the luminance signal Y is sampled by the clock 9a and the chrominance signals $C_A$ and $C_B$ are sampled by the clock 9b, respectively. The frequencies of the clocks 9a and 9b will be described in detail later. Luminance signal data 12 which was converted into the digital data is directly input into a buffer memory 16. On the other hand, chrominance signal data 13 and 14 are once input to a vertical filter 15, by which a resolution in the vertical direction of a picture plane is reduced by ½. The signal which is output from the vertical filter 15 becomes a line sequential chrominance signal $C_L$ (151) in which the signals $C_A$ and $C_B$ alternately appear. The signal $C_L$ is input to the buffer memory 16. The signal which was input to the buffer memory 16 is sequentially written into predetermined addresses in the memory by the address control circuit 17.

In FIG. 2(a), (b), and (c) show the luminance signal Y and chrominance signals $C_A$ and $C_B$ which are obtained as output signals of the matrix circuit. One horizontal scan period (one line period) in the above three kinds of signals is set to $\tau_h$. In the period $\tau_h$, a horizontal blanking period is set to $\tau_b$, and an effective video period which is obtained by subtracting $\tau_b$ from $\tau_h$ is set to $\tau_e$. The number of samples (the number of pixels) in each of the signal periods is set as follows. First, with respect to the luminance signal Y, the number of samples in one horizontal scan period $\tau_h$ is set to 1440. Among those samples, the horizontal blanking period $\tau_b$ comprises 180 samples and the effective video period $\tau_e$ comprises 1260 samples. With regard to the chrominance signals $C_A$ and $C_B$, the sampling frequency is set to ⅓ of the sampling frequency of the luminance signal Y. The number of samples in each period is set to ⅓ (480 samples) of the above number of samples. That is, the number of samples in the period $\tau_h$ of each of the chrominance signals is set to 480, the number of samples in the horizontal blanking period $\tau_b$ is set to 60, and the number of samples in the effective video period is set to 420.

Figure 2:
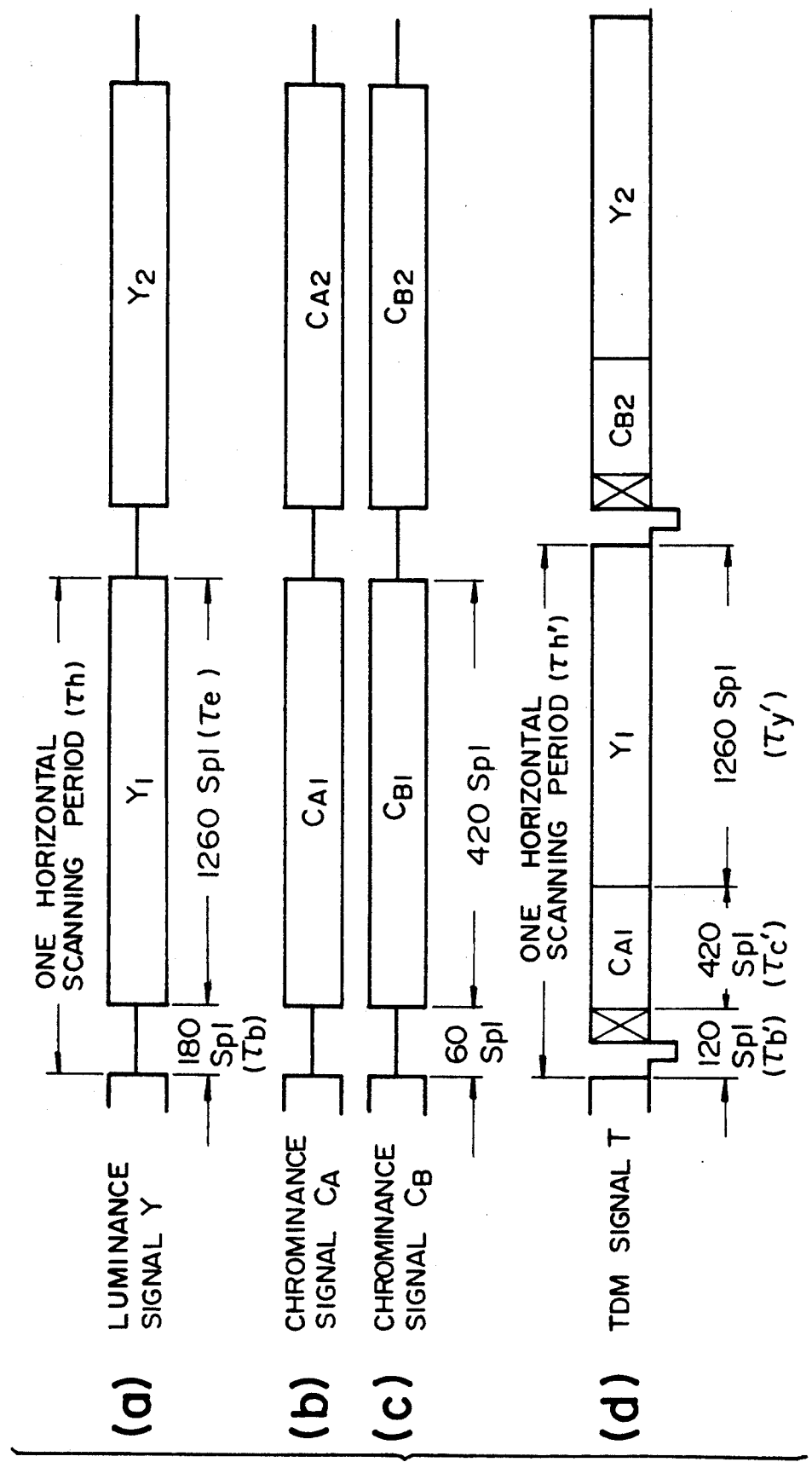
FIG. 2 is a diagram showing an input luminance signal and input chrominance signals and a TDM signal which is obtained by time base multiplexing the luminance and chrominance signals.

On the other hand, (d) in FIG. 2 shows a signal (hereinafter, referred to as a TDM signal T) which is obtained by time base compressing the luminance signal Y and the chrominance signals $C_A$ and $C_B$ and, thereafter, time division multiplexing (TDM) there signals in one horizontal scan period. One horizontal scan period of the TDM signal T is set to $\tau_h'$ and there is a relation of $\tau_h \leq \tau_h'$. On the other hand, the TDM signal comprises three periods: a horizontal blanking period $\tau_b'$, a time base compression chrominance signal period $\tau_c'$, and a time base compression luminance signal period $\tau_y'$. A sync signal of a negative polarity which was produced by a sync signal producing circuit 23 in FIG. 1, a burst signal as a basic signal of the time base information upon reproduction, and the like are included in the horizontal blanking period $\tau_b'$. On the other hand, the numbers of samples in the above three periods are set as follows. Namely, the period $\tau_b'$ comprises 120 samples, the period $\tau_c'$ comprises 420 samples, the period $\tau_y'$ comprises 1260 samples, and one horizontal scan period ($\tau_h'$) comprises total 1800 samples.

The sampling frequencies of the above respective signals will now be described. With respect to the sampling frequencies of the input video signal, with regard to the luminance signal of the 1125/60 system, one horizontal scan period $\tau_h$ is given by $$\tau_h = 1/30 \times 1125.$$

Since $\tau_h$ comprises 1440 samples, a sampling frequency $f_{sy}$ of the luminance signal Y is $$f_{sy} = 30 \times 1125 \times 1440 = 48.6 \text{ MHz}$$

On the other hand, a sampling frequency $f_{sc}$ of each of the chrominance signals $C_A$ and $C_B$ is $$f_{sc} = f_{sy}/3 = 16.2 \text{ MHz}$$

With respect to the luminance signal of the 1250/50 system, one horizontal scan period $\tau_h$ is given by $$\tau_h = 1/25 \times 1250$$

Since $\tau_h$ comprises 1440 samples, the sampling frequency $f_{sy}$ of the luminance signal Y is $$f_{sy} = 25 \times 1250 \times 1440 = 45.0 \text{ MHz}$$

On the other hand, the sampling frequency $f_{sc}$ of each of the chrominance signals $C_A$ and $C_B$ is $$f_{sc} = f_{sy}/3 = 15.0 \text{ MHz}$$

To produce the TDM signal, it is sufficient that the video signal data stored in predetermined addresses in the memory 16 is read out by using a read clock having a frequency higher than each of the above sampling frequencies in accordance with the order of the chrominance signals and luminance signal. The actual frequency of the read clock will be explained in detail hereinbelow.

Figure 3:
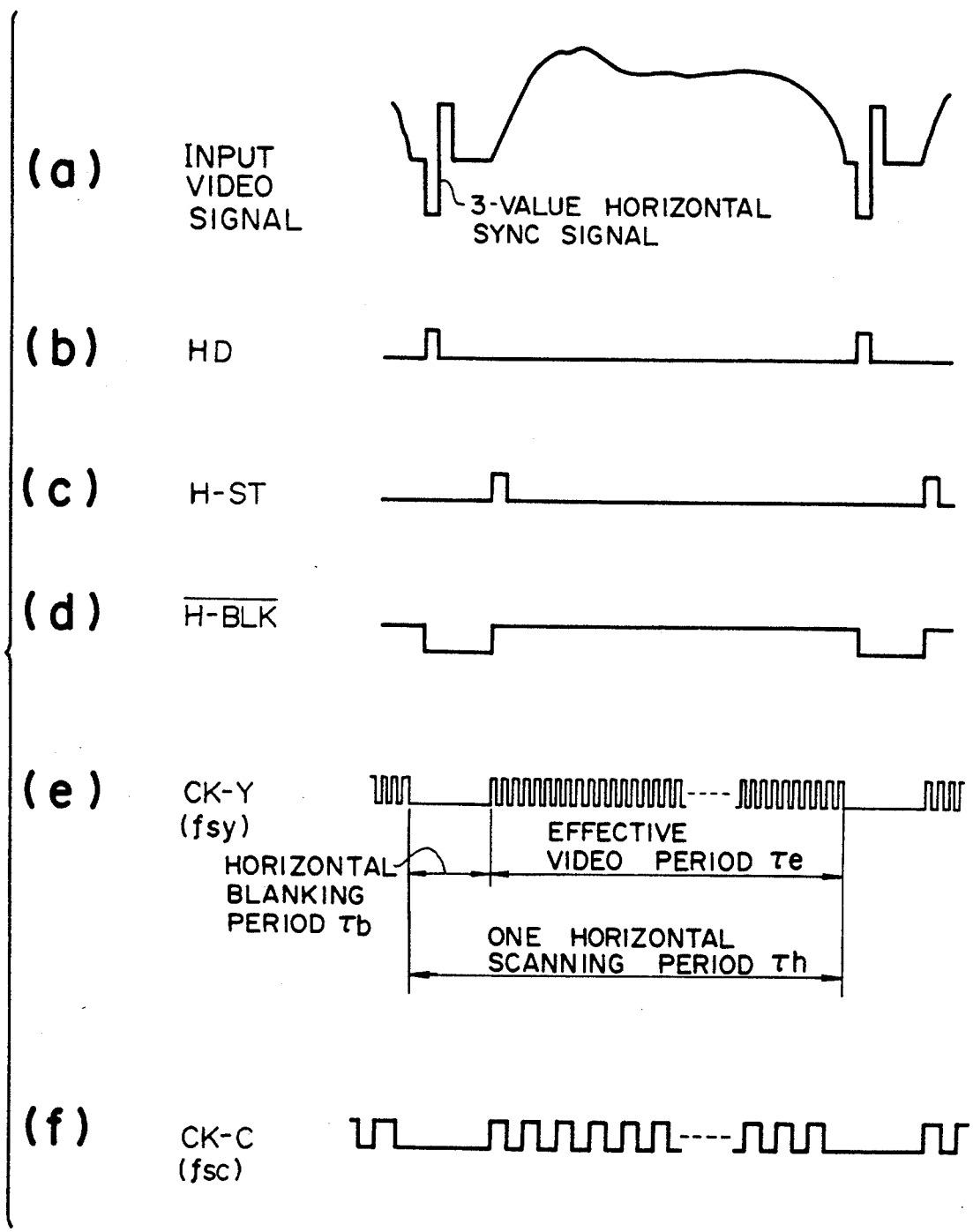
FIG. 3 is a diagram showing each clocks for control.
Figure 4:
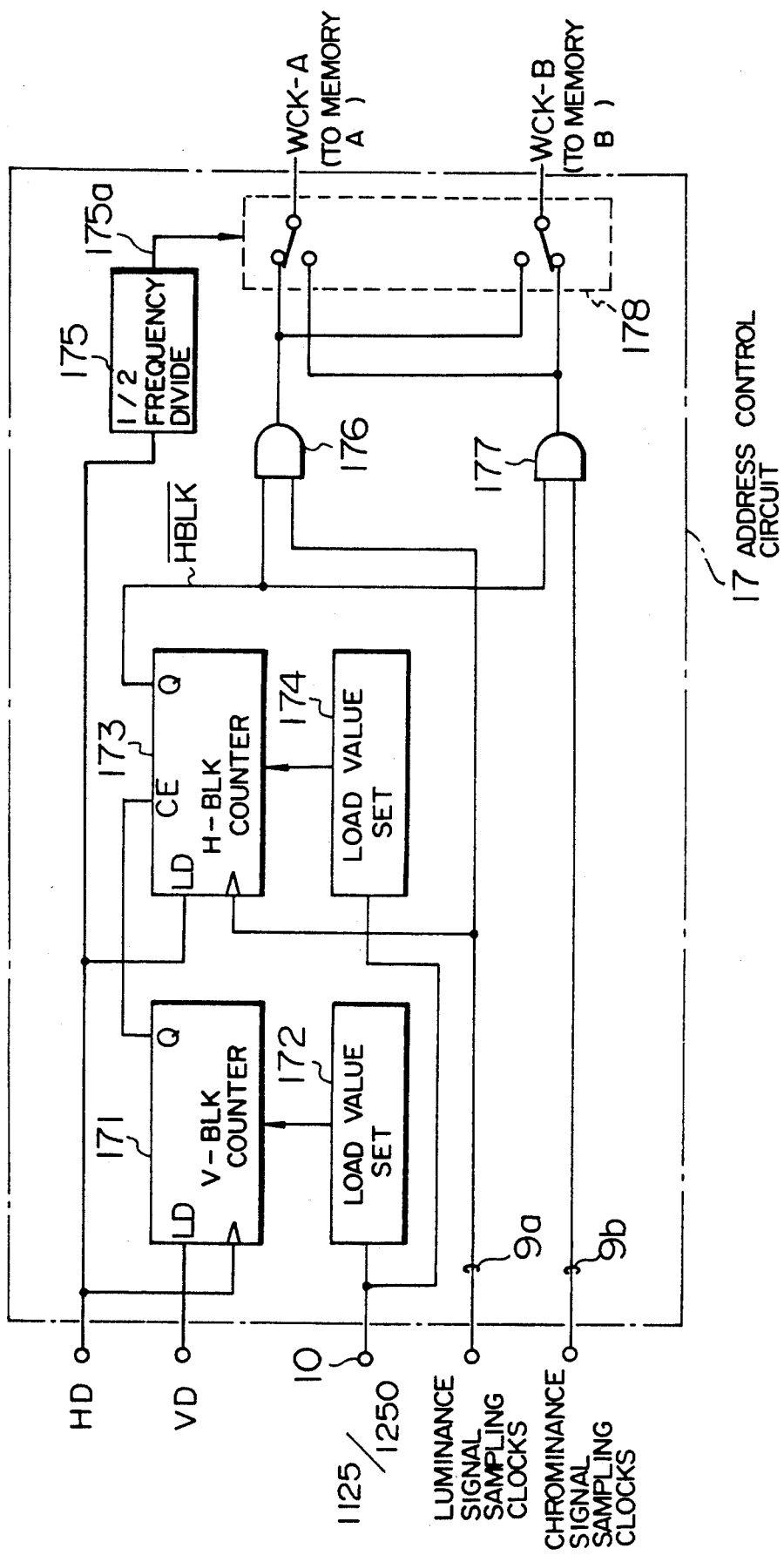
FIG. 4 shows a construction example of an address control circuit.
Figure 5:
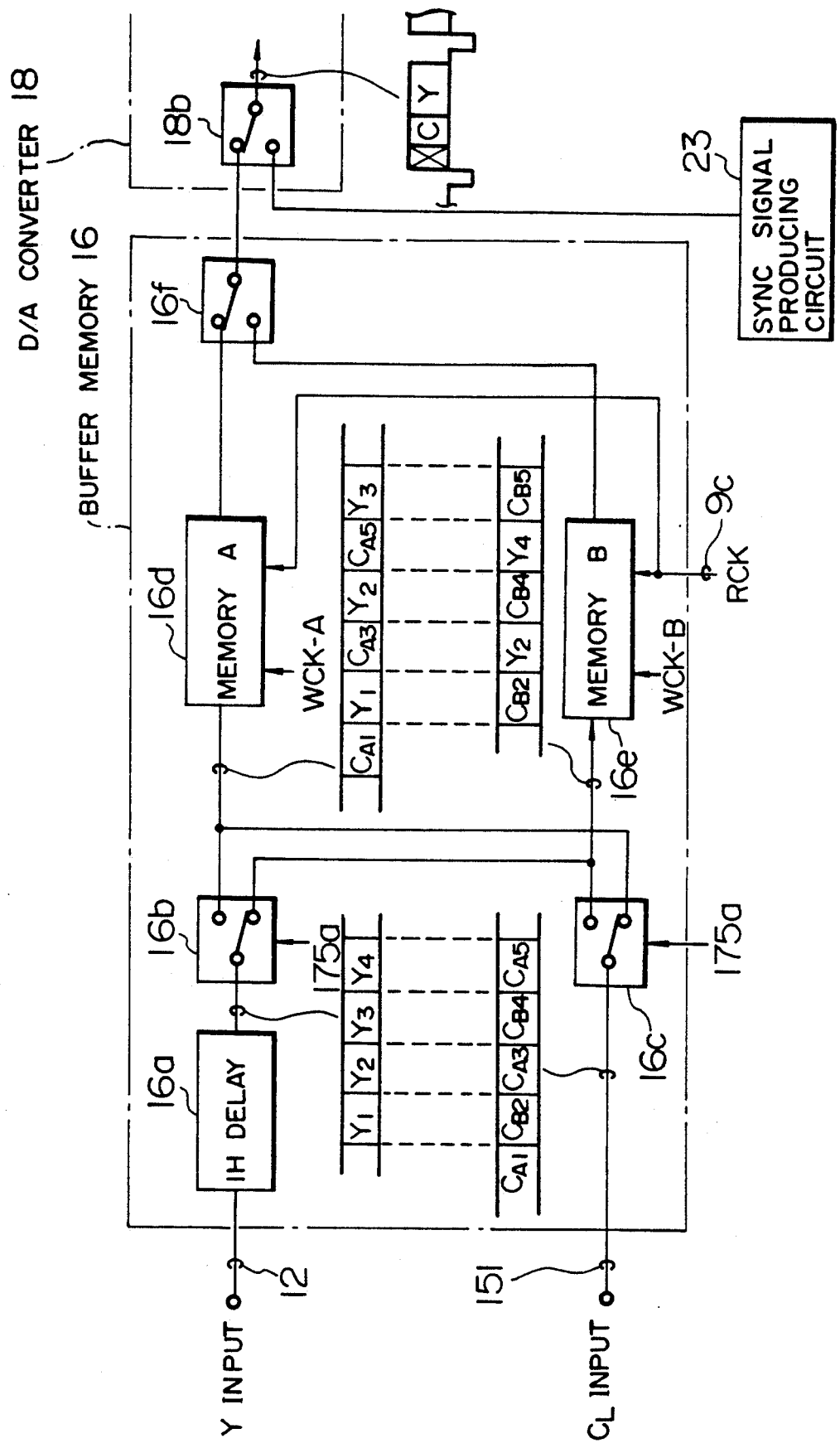
FIG. 5 shows a construction example of a buffer memory.

FIGS. 3 to 5 are diagrams for explaining the processes up to when the video signal which was input to the VTR is stored into the memory.

FIG. 3 is a waveform diagram showing timings ((b) to (f)) for the input video signal ((a) in FIG. 3) and the respective signals. In FIG. 3, (a) denotes the input video signal accompanied with a three-value sync signal; (b) indicates a horizontal sync signal HD which is obtained from the above sync signal; and (c) represents an H-ST pulse which is produced by using the signal HD as a reference. A leading edge of the signal (c) indicates the start point of the effective video period of one line. (d) denotes a pulse H-BLK indicative of the horizontal blanking period. The period of time when the signal (d) is at the high level indicates the effective video period of one line. (e) denotes a sampling clock of the luminance signal such that the frequency is set to $f_{sy}$. As mentioned above, $f_{sy} = 48.6$ MHz for the 1125/60 system and $f_{sy} = 45.0$ MHz for the 1250/50 system. On the other hand, (f) denotes a sampling clock of the chrominance signals and its frequency $f_{sc} = 16.2$ MHz for the 1125/60 system and $f_{sc} = 15.0$ MHz for the 1250/50 system. As shown in FIG. 3, those sampling clocks are forcedly set to the low level in the horizontal blanking period and oscillate in only the effective video period and are sent to the A/D converter 11.

FIG. 4 is a diagram showing an example of a construction of an address control circuit for producing or controlling the respective signals shown in FIG. 3 and controlling the addresses in the memory. In FIG. 4, the sync signals such as an HD (horizontal sync signal) and a VD (vertical sync signal) which were separated and produced from the sync signal by the control signal producing circuit, the system discrimination signal (displaying by 1125/1250) indicative of the system of the input video signal, and the sampling clocks of the above luminance signal and chrominance signals are input to respective sections of the address control circuit 17. In the address control circuit 17, reference numeral 171 denotes a vertical blanking (V-BLK) counter to count the vertical blanking periods. The counter 171 operates by using the HD as a clock and by using the VD as a load pulse.

Reference numeral 172 denotes a load value setting circuit to set a load value of the V-BLK counter 171. The above load value is changed and set in accordance with the system discrimination signal. With the above construction, the system of the input video signal changes. For instance, even if the vertical blanking length of every system changes such that the vertical blanking period is set to 22 H for the 1125/60 system and that the vertical blanking period is set to 85 H for the 1250/50 system, the start point of the effective line corresponding to the vertical blanking length can be specified. The result of the counter 171 is input to a count enable (CE) terminal of a horizontal blanking (H-BLK) counter 173 at the next stage. The H-BLK counter 173 operates by using the horizontal sync signal HD as a load pulse and by using the luminance signal sampling clock 9a as a clock. When a signal indicative of the effective line is input from the V-BLK counter 171 at the front stage to the CE terminal of the H-BLK counter 173, the counter 173 starts counting. Reference numeral 174 denotes a load value setting circuit connected to the H-BLK counter 173 and is a circuit to specify the timing for the H-ST pulse shown at (c) in FIG. 3. Now, assuming that the input video signal is based on the 1125/60 system, the number of clocks of one line is set to 1440 according to the luminance signal sampling clock 9a. Among them, the horizontal blanking period comprises 160 clocks. That is, the H-ST pulse (pulse indicative of the start of the effective period of 1H) is produced at the same position as that of the 161st clock from the start of 1H. The position of the H-ST pulse can be arbitrarily designated by the load value setting circuit 174. By constructing such as to control the load value setting circuit 174 by the system discrimination signal, it is also possible to cope with the system in which the number of clocks in the horizontal blanking period differs. The horizontal blanking counter 173 produces an output signal $\overline{\text{H-BLK}}$ as shown at (d) in FIG. 3. Reference numeral 176 denotes an AND circuit which receives the luminance signal sampling clock and the $\overline{\text{H-BLK}}$ signal. A signal CK-Y as shown at (e) in FIG. 3 is obtained as an output of the AND circuit 176. On the other hand, reference numeral 177 denotes an AND circuit which receives the chrominance signal sampling clock and the $\overline{\text{H-BLK}}$ signal. A signal CK-C as shown at (f) in FIG. 3 is obtained as an output of the AND circuit 177. Reference numeral 175 denotes a ½ frequency dividing circuit which receives the HD signal and produces a signal 175a in which the high and low levels are alternately repeated every line. Reference numeral 178 denotes two kinds of change-over switches. Both of the two switches select either one of the outputs of the AND circuits 176 and 177. However, the polarities of the switches are opposite. When the upper switch selects the output of the AND circuit 176, the lower switch selects the output of the AND circuit 177. An output of the upper switch is sent to a memory A shown in FIG. 5 as a write clock (WCK-A) of the memory A. An output of the lower switch is sent to a memory B shown in FIG. 5 as a write clock (WCK-B) of the memory B.

FIG. 5 is a diagram showing an example of a construction of the buffer memory 16. Two kinds of video signals such as luminance signal data (Y) 12 which was converted into the digital signal by the A/D converter 11 and line sequential chrominance signal data ($C_L$) 151 which had been likewise converted into the digital signal and was, thereafter, converted into the line sequential chrominance signal by the vertical filter 15 are input to the buffer memory 16. The luminance (Y) data 12 is delayed by 1H (one line period of the input video signal) by a 1H delay circuit 16a and is sent to a change-over switch 16b. On the other hand, the $C_L$ data 151 is directly sent to a change-over switch 16c. The switches 16b and 16c are respectively connected as shown in the diagram and their outputs are input to memories A (16d) and B (16e). The switching mode of each of the switches 16b and 16c is inverted by the change-over switch control signal 175a (FIG. 4) whose level changes every line. As shown in FIG. 5, the output signals of the switches have a structure in which the Y data and the $C_L$ data are alternately exchanged every line. The memories A (16d) and B (16e) are what are called FIFO (First-in First-out) memories, a kind of shift registers. A capacity of each of the memories A and B is properly set to a value from about a few lines to one frame in accordance with the system. On the other hand, those memories have the following features. First, the address in the memory is automatically updated by the write clocks (WCK-A, WCK-B) and the read clock (RCK). In particular, a circuit to form addresses is unnecessary as an external circuit. On the other hand, no problem occurs even if there is an asynchronous relation between the write clocks (WCK-A, WCK-B) and the read clock (RCK). A memory IC having such a function has already been commercially available at present as what is called an image processing memory IC. It is considered that the realization of a high processing speed and a large capacity will be also progressed in future.

The respective video signal data which were input to the memories A (16d) and B (16e) are written into predetermined addresses in the memories synchronously with the write clocks (WCK-A, WCK-B). As in the embodiment, there is a feature such that if the number of effective lines in one frame and the number of effective pixels in one line are set to constant values irrespective of the system of the video signal, the above memories and their peripheral control circuits can be commonly used irrespective of the system. The video data written into the memories as mentioned above are sequentially read out of the memories A and B by the read clock RCK (9c) produced by the control signal producing circuit 9 and are sent to a D/A converter 18 as signals according to the line numbers by a change-over switch 16f. A change-over switch is provided in the input section of the D/A converter 18 as shown in the diagram. The sync information produced by the sync signal producing circuit 23 and the video data read out of the memories are alternately D/A converted.

The video signal (TDM signal) with the sync information added as mentioned above is converted into an analog signal 18a by the D/A converter 18. The analog signal 18a is then frequency modulated by the frequency modulating circuit 19 and, thereafter, it is recorded by magnetic heads 103 and 104 onto a magnetic tape 102 wrapped around a cylinder 101 with a wrap angle of 180° through a recording amplifier 20. A motor servo control circuit 22 controls a rotational speed and a rotational phase of the cylinder on the basis of the reference signal 9d which is sent from the control signal producing circuit 9. At this time, to record the wide band signal as in the embodiment, it is necessary to raise the relative speed between the tape and the heads. Therefore, the cylinder 101 is rotated at a frequency which is n times (n is a natural number) as high as the frame frequency in correspondence to the frame frequency of the input video signal. In the case where the tape wrap angle to the cylinder is set to 180° as in the embodiment, for instance, n is set to 4, and the rotational speed is set to $n \times 60/2 = 120$ r/sec for the 1125/60 system and is set to $n \times 50/2 = 100$ r/sec for the 1250/50 system. As a reference signal 9d which is sent to the motor servo control circuit 22, a square wave of 30 Hz which is equal to the frame frequency and whose phase is synchronized with the input sync signal is used in the case of the 1125/60 system. A square wave of 25 Hz is similarly used in the case of the 1250/50 system.

Figure 6:
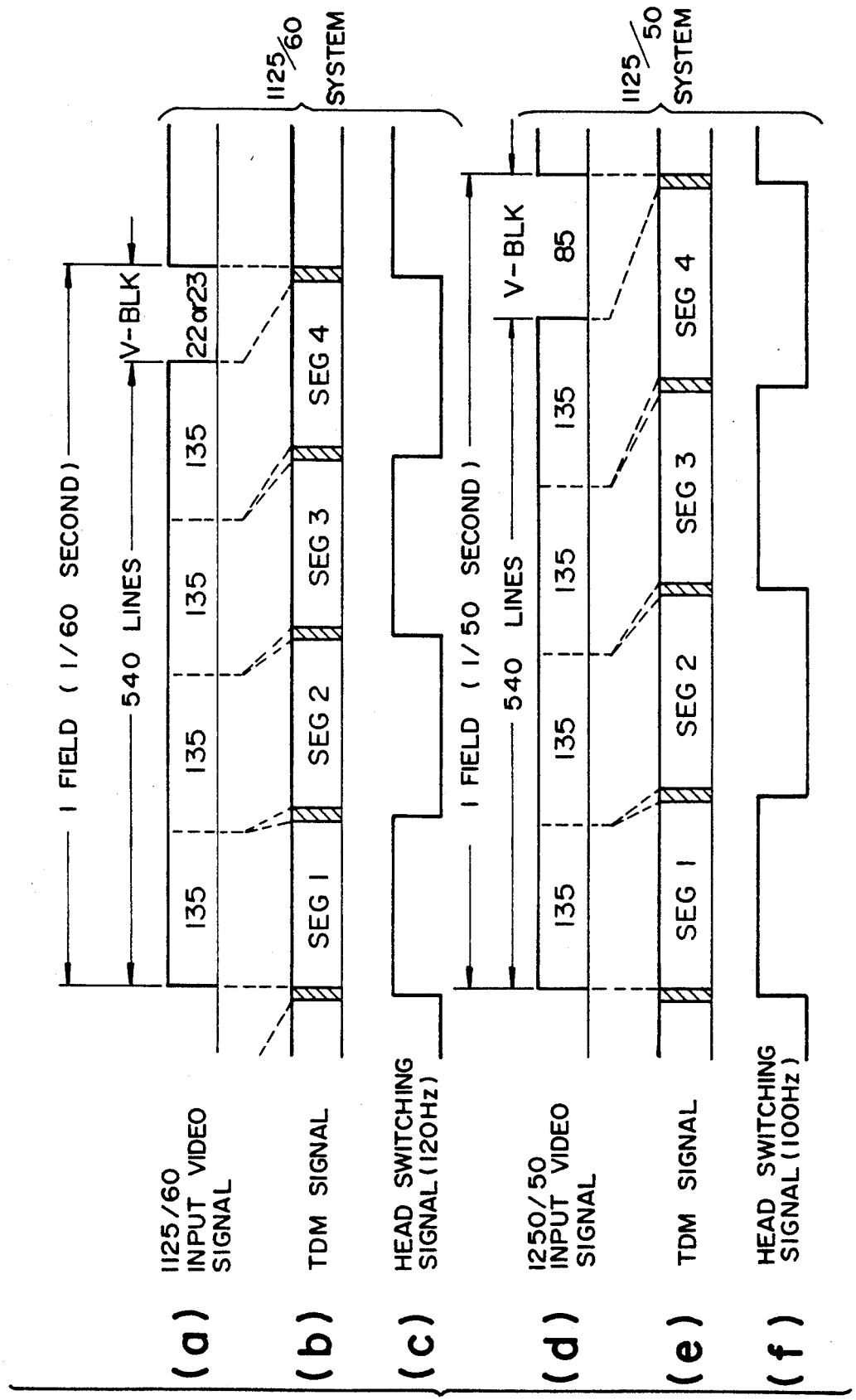
FIG. 6 is a diagram showing input video signals, TDM signals, and head switching signals in one field.

FIG. 6 shows the input video signals (a) and (d), TDM signals (b) and (e), and head switching signals (c) and (f) for one field with respect to each of the 1125/60 system and the 1250/50 system. In the invention, it is the first requirement that the numbers of effective lines which are recorded in one frame of the above two systems are made coincident. In the case of the embodiment, in both of the systems, the number of effective lines to be recorded in one frame is set to, e.g., 1080 lines so as to be equal to the value which is integer times as large as the value of n. By setting the number of effective lines to 1080, as shown in (a) and (d) in FIG. 6, the vertical blanking period (displayed as V-BLK in FIG. 6) in each system is set to 22 or 23 lines for the 1125/60 system and to 85 lines for the 1250/50 system.

On the other hand, as mentioned above, in association with the rotation of the cylinder whose rotational speed is n times (n=4 in the embodiment) as large as the ordinary speed, the video signal in one field is divided and recorded into n (=4) blocks (each block is called a segment). The above recording method is generally called a segment recording method. In the embodiment, since the number of recording effective lines in one field is set to 540, the number of effectives lines constructing one segment is set to 540/4, namely, 135 lines. The number of effective lines which are recorded per track is set to 135. In this case, since the number of recording effective lines has been set to a value which is integer times as large as n as mentioned above, the number of effective lines which are recorded in each segment is equally given by an integer number. In the segment recording method, as mentioned above, the continuous video signal in one field is distributed and recorded on four tracks, so that a skew due to expansion and contraction of the tape occurs in a joint portion between segments and discontinuity occurs on the time base. To avoid such discontinuity, as disclosed in JP-A-61-166284, a blanking period (hatched portions shown in (b) and (e) in FIG. 6 and which is referred to as a head switching area) to switch the heads are provided between segments. The skew is eliminated by executing the head switching and the joining process of the segments in the head switching area upon reproduction. (b)

and (e) in FIG. 6 show the TDM signals shown in (d) in FIG. 2 for one field period. A head switching area corresponding to from one to a few lines is provided between segments. (c) and (f) in FIG. 6 indicate head switching signals of 120 Hz and 100 Hz and are signals indicating that the output from which head is selected between the two heads which face each other at an angle of 180° upon reproduction.

As mentioned above, in each of the 1125/60 and 1250/50 systems, by setting the number of effective lines recorded per frame to the same number of 1080 lines, the number of lines which are recorded per track is set to 135. Due to this, an apparent amount of information which is recorded per track becomes constant irrespective of the system and the principal recording patterns on the tape can be substantially made constant.

Figure 7:
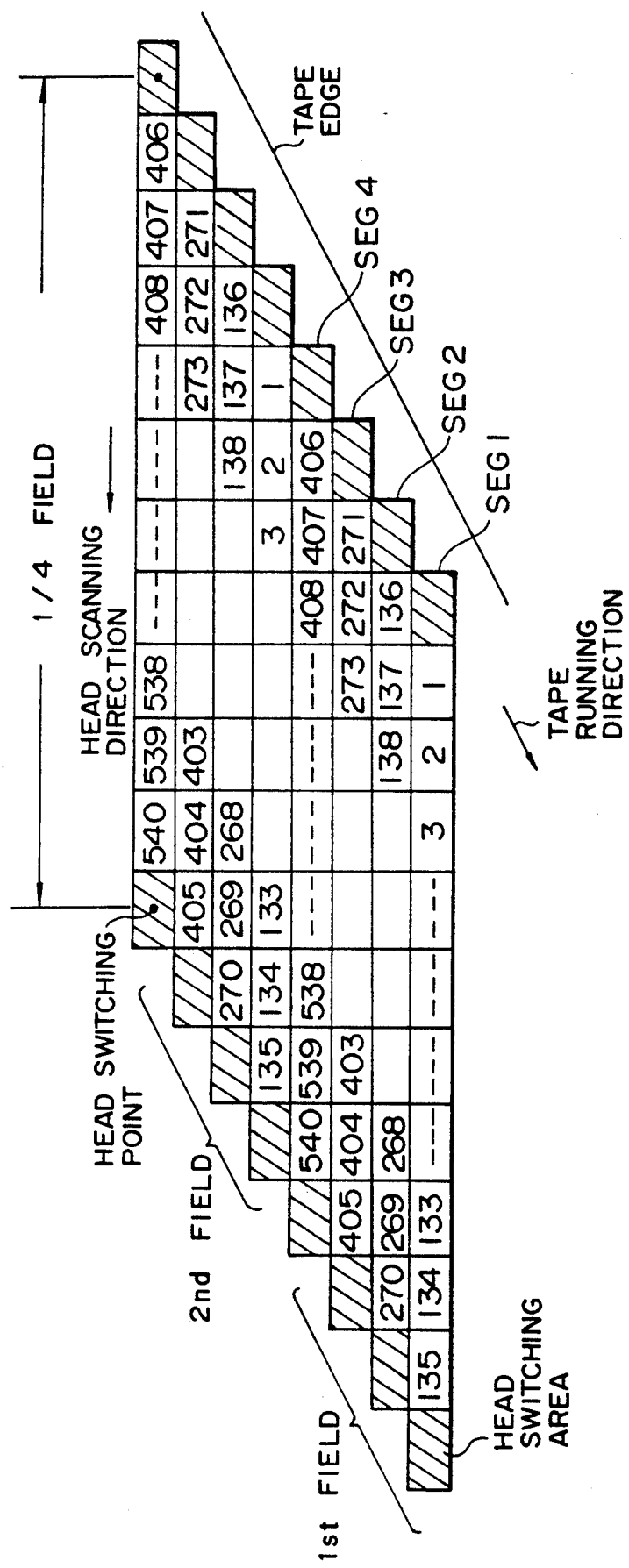
FIG. 7 is a diagram showing a recording pattern on a tape.

FIG. 7 shows recording patterns on the tape according to the embodiment and shows an arrangement of the recording signals existing in two fields comprising the first and second fields. In FIG. 7, the hatched portions on the incoming and outgoing sides of each track denote head switching areas. The actual head switching operation is executed at one point in such an area.

Figure 8A:
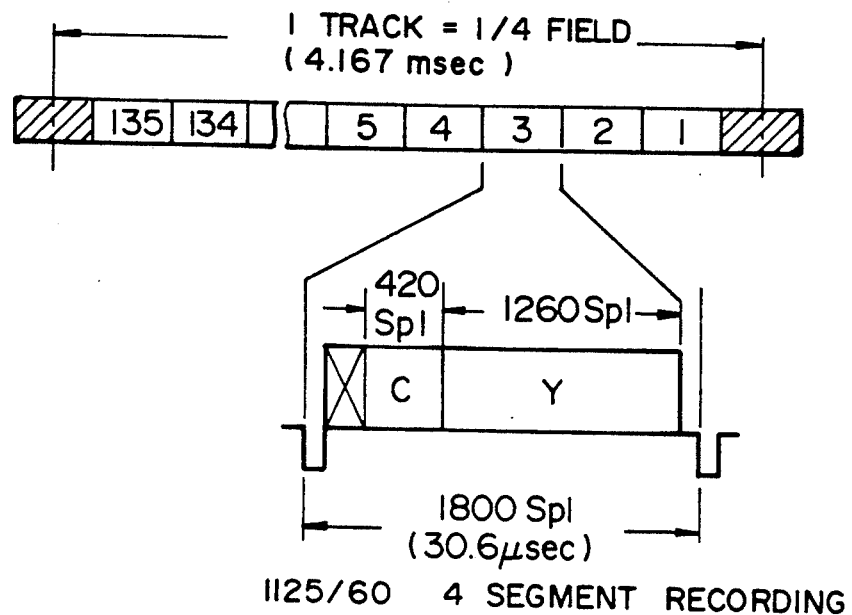
FIGS. 8(*a*) and 8(*b*) are diagrams for explaining a format of the signal on one track which was recorded.
Figure 8B:
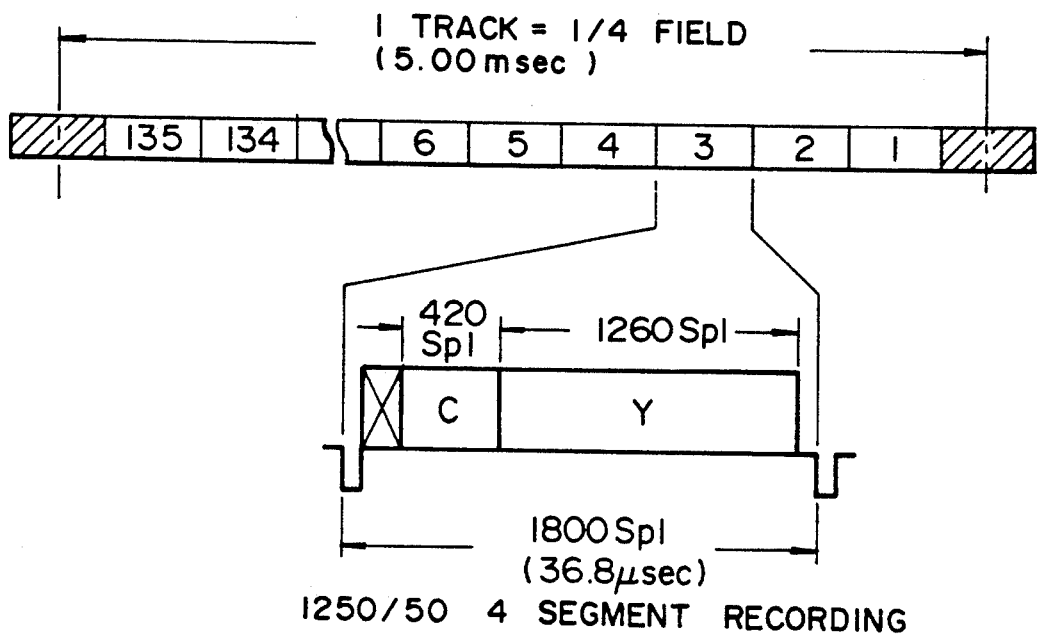

FIGS. 8(a) and 8(b) are diagrams showing in more detail a construction of segment 1 of the first field in FIG. 7. FIG. 8(a) shows a construction of a segment in the 1125/60 system and FIG. 8(b) shows a construction of a segment in the 1250/50 system. First, in FIG. 8(a), one track is constructed by a total of 136 lines comprising the recording effective lines (135 lines) and one line (0.5 line on the incoming side and 0.5 line on the outgoing side) of the head switching area. At this time, the scanning time per one track, that is, per one segment, corresponds to the time of 1/n field because one field is divided to n segments and recorded. Since n=4 in the embodiment, the scanning time per segment is set to 4.167 msec corresponding to ¼ field. Therefore, the time per line of the TDM signal to be recorded is set to 4.167 msec/136 lines, namely, about 30.6 μsec. Although FIG. 8(a) shows a structure of one line, as also already described in FIG. 2, one line comprises 1800 samples and there is a time interval of about 17 nsec per sample. Therefore, the reading frequency from the memory, that is, the sampling frequency of the TDM signal is set to 58.75 MHz. On the other hand, a structure per track in the case of the 1250/50 system is as shown in FIG. 8(b). In a manner similar to the above case of the 1125/60 system, the period per line is set to 36.76 'sec. Therefore, the time interval per sample is set to 20.42 nsec and the sampling frequency of the TDM signal is set to 48.97 MHz. When comparing the sampling frequencies of the TDM signal (the signal which is actually recorded onto the tape) in the 1125/60 system and the 1250/50 system, a ratio between them is such that 58.75 MHz:48.67 MHz=1.2:1 and is equal to the ratio of the field frequencies, that is, 60:50. The above ratio is, further, also equal to the ratio of the relative speeds of the tape and the heads. As mentioned above, by making the ratio of the sampling frequency of the TDM signal to be recorded, in other words, the frequency of the read clock when reading out of the buffer memory upon recording coincide with the ratio of the field frequency, the recording area per line (or per pixel) on the tape can be made constant irrespective of the system.

Figure 9:
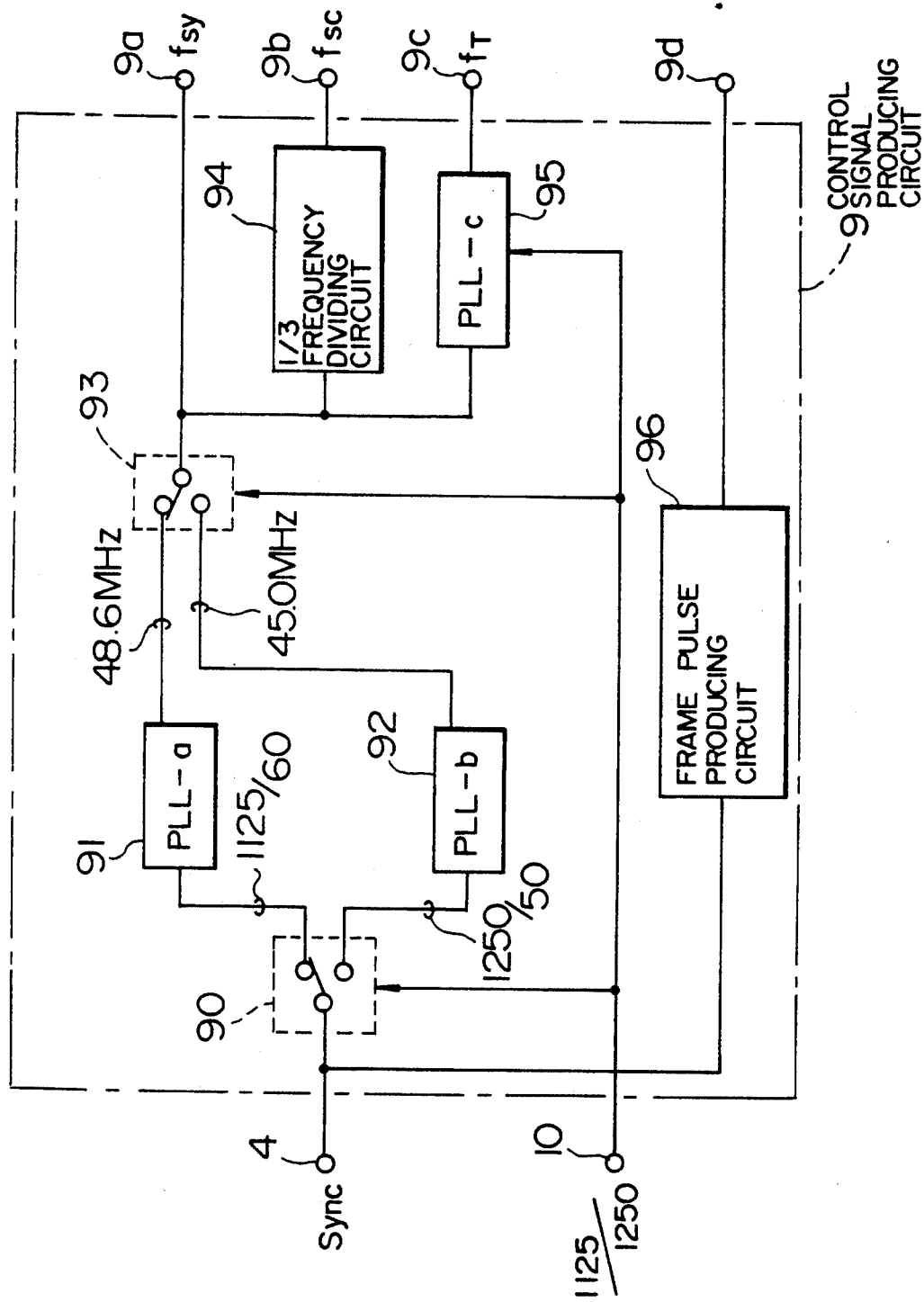
FIG. 9 is a block diagram showing a construction of a control signal producing circuit of the reproducing system.

FIG. 10 shows a table list of the sampling frequencies in the respective sections in the embodiment. FIG. 9 shows an internal construction of the control signal producing circuit 9 to produce clocks having the above respective frequencies. In FIG. 9, reference numeral 4 denotes the sync signal input terminal. The sync signal of the recording video signal which was input from the terminal 4 is input to a PLL-a (91) in the case where the input video signal is based on the 1125/60 system and to a PLL-b (92) in the case of the 1250/50 system through a change-over switch 90. In the above PLLs, the sampling clocks corresponding to those systems are produced. That is, the clocks of 48.6 MHz are produced in the PLL-a (91) and the clocks of 45.0 MHz are produced in the PLL-b (92), respectively. Outputs of the PLLs 91 and 92 are selected by a change-over switch 93 which is interlocked with the switch 90 and the selected signal is output to the terminal 9a. The clocks which were output to the terminal 9a are the sampling clocks of the input luminance signal and have the frequency of $f_{sy}$ shown in the table of FIG. 10. On the other hand, the clocks are also sent to a ¼ frequency dividing circuit 94 and the frequency is divided by ¼ and, thereafter, the frequency divided signal is output to the terminal 9b. The above clocks are the sampling clocks of the input chrominance signals and have the frequency of $f_{sc}$ shown in the table of FIG. 10. Further, the clocks selected by the switch 93 are also sent to a PLL-c (95), by which the clocks having a frequency of $f_T$ shown in the table of FIG. 10 are produced. The signal produced by the PLL-c (95) is output to the terminal 9c. As shown in FIG. 1, the above clocks are sent to the A/D converter 11, address control circuit 17, and D/A converter 18 and are used as clocks for those circuits. In FIG. 9, a frame pulse producing circuit 96 produces a frame pulse phase-synchronously with the input sync signal. The frame pulse is output to the terminal 9d and is used as a reference signal of the servo system by the motor servo control circuit 22. In the case where the input video signal is based on the 1125/60 system, the frame pulse is automatically switched to 30 Hz. In the case of the 1250/50 system, the frame pulse is automatically switched to 25 Hz.

The operation of each section upon reproduction will now be described with reference to FIG. 1 again. The video signal (the frequency modulated TDM signal in the example) which was reproduced from the magnetic tape 102 by the heads 103 and 104 is amplified by a preamplifier 201. Thereafter, the amplified signal is frequency demodulated by a frequency demodulating circuit 202 and converted into the TDM signal. Then, the TDM signal is input to an A/D converter 203 and a sync separating circuit 204. The sync separating circuit 204 separates time base information 207 in the reproduction signal from a negative polarity sync signal and sync information (for instance, a burst signal or the like) added to the TDM signal. The time base information 207 is sent to the control signal producing circuit 208. The control signal producing circuit 208 receives the time base information 207 and produces various control signals, clocks (208a to 208e), and the like which are sent to the A/D converter 203, the address control circuit 205, a sync signal producing circuit 218, and the D/A converter 213.

On the other hand, the TDM signal which was input to the A/D converter 203 is sampled in accordance with the clocks 208e which are sent from the control signal producing circuit 208 and converted into the digital signal. At this time, since the clocks 208e are produced synchronously with the time base information 207 obtained from the reproduction signal, they include a time base error such as a jitter or the like included in the reproduction signal. The time base can be corrected by sampling the reproduction signal (TDM signal) by using the clocks 208e. A digital signal 203a obtained as mentioned above is once stored into a special address in the buffer memory 206 which is designated by the address control circuit 205. Then, a luminance signal Y 209 and a line sequential chrominance signal $C_L$ 210 are read out of the buffer memory 206 in accordance with the order. The luminance signal Y 209 is directly sent to a D/A converter 213 and converted into the original analog signal. However, the line sequential chrominance signal $C_L$ 210 is once input to a data interpolating circuit 212. The data interpolating circuit 212 executes the interpolation of the chrominance signal in which the number of lines was thinned out to $\frac{1}{2}$, so that the chrominance signals $C_A$ and $C_B$ which are continuous every line are obtained. The chrominance signals are sent to the D/A converter 213 and converted into the original analog chrominance signals $C_A$ and $C_B$. The three kinds of signals of a luminance signal Y 214 and chrominance signals $C_A$ 215 and $C_B$ 216 which were obtained as mentioned above are input to an inverse matrix circuit 217 and are arithmetically operated and processed and converted into the original three primary color signals and are output to terminals R 219, G 220, and B 221, respectively. The sync producing circuit 218 produces a sync signal on the basis of information (which is input from the terminal 10) to discriminate that the signal which is being reproduced is based on which one of the 1125/60 system and the 1250/50 system and the information from the control signal producing circuit 208. The sync signal is output from a sync terminal 222.

As described above, in the embodiment, when recording the video signals of a plurality of systems in which the field frequencies and the numbers of scanning lines are different, by making the numbers of effective lines recorded and the numbers of effective pixels per line in the plurality of systems coincide, it is possible to cope with the plurality of systems with the same construction of the fundamental signal processing system in the VTR. The costs of the VTR and the development period of time can be reduced. Further, as described in the above embodiment, by setting the sampling frequency of the signal (TDM signal) to be recorded onto the magnetic tape to a value which is proportional to the field frequency of each system, the area which is occupied by one line and, further, by one pixel recorded on the tape can be made constant. Thus, there is an advantage such that in the case where the video signals of different systems are recorded and reproduced, the picture qualities of both of the recorded and reproduced video signals can be held to almost the same picture quality.

Another embodiment of the invention will now be described with reference to FIGS. 11 to 17, 18A and 18B.

Figure 11:
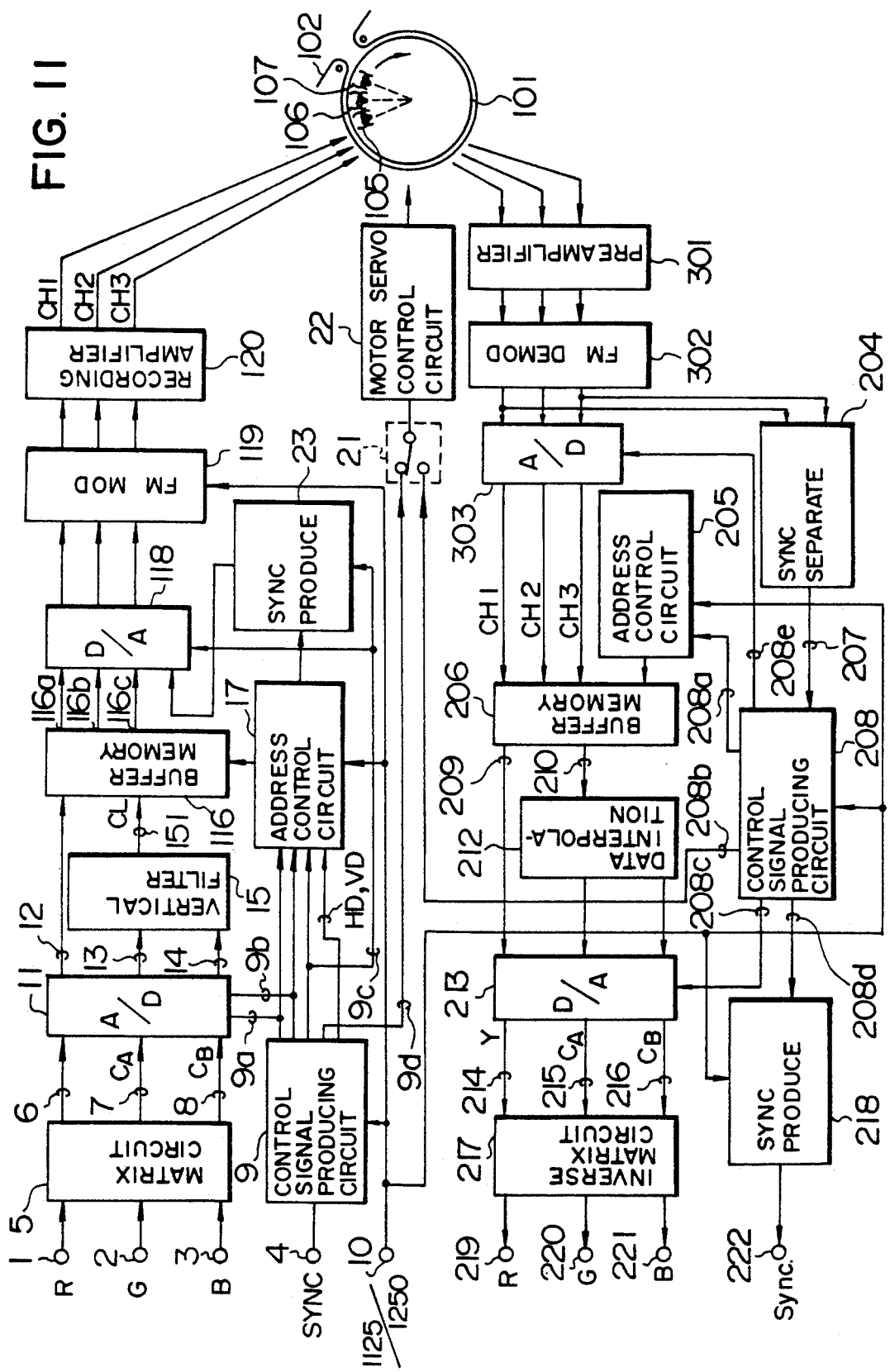
FIG. 11 is a block diagram of a VTR as another embodiment of the invention.

FIG. 11 is a block diagram of a VTR showing another embodiment of the invention. The blocks having the functions which are common to those of the blocks in FIG. 1 shown above are designated by the same reference numerals as the numbers of the parts shown in FIG. 1. In FIG. 11 as well, the input and output video signals are the high definition TV signals in a manner similar to the foregoing embodiment. The embodiment of FIG. 11 has features such that the video signal of any one of the 1125/60 and 1250/50 systems is accepted as an input signal and the numbers of scanning lines which are actually recorded onto the recording medium (magnetic tape) with respect to the above two systems are made coincident, thereby making the recording patterns on the recording medium almost coincident irrespective of the system of the input video signal. The operation of each section in the second embodiment will now be described in detail hereinbelow.

In FIG. 11, the input signal are the three primary color signals of R, G, and B and are input from the terminals 1, 2, and 3, respectively. After that, the input signals are once stored into a buffer memory 116 through the matrix circuit 5, A/D converter 11, and vertical filler 15 in a manner similar to the operation in the block diagram of FIG. 1. The video signal data stored in the buffer memory 116 is sequentially output from three output ports 116a, 116b, and 116c provided for the buffer memory 116. The video signal data which were output from the three output ports are converted into the analog signals by a D/A converter 118. The analog signals are then frequency modulated by a frequency modulating circuit 119 and recorded through a recording amplifier 120 of three channels by three magnetic heads 105, 106, and 107 onto the magnetic tape 102 wrapped around the rotary cylinder 101. As in the embodiment, a method whereby the video signal is divided into three channels and the signals of three channels are simultaneously recorded is called a 3-channel division recording method.

Figure 12:
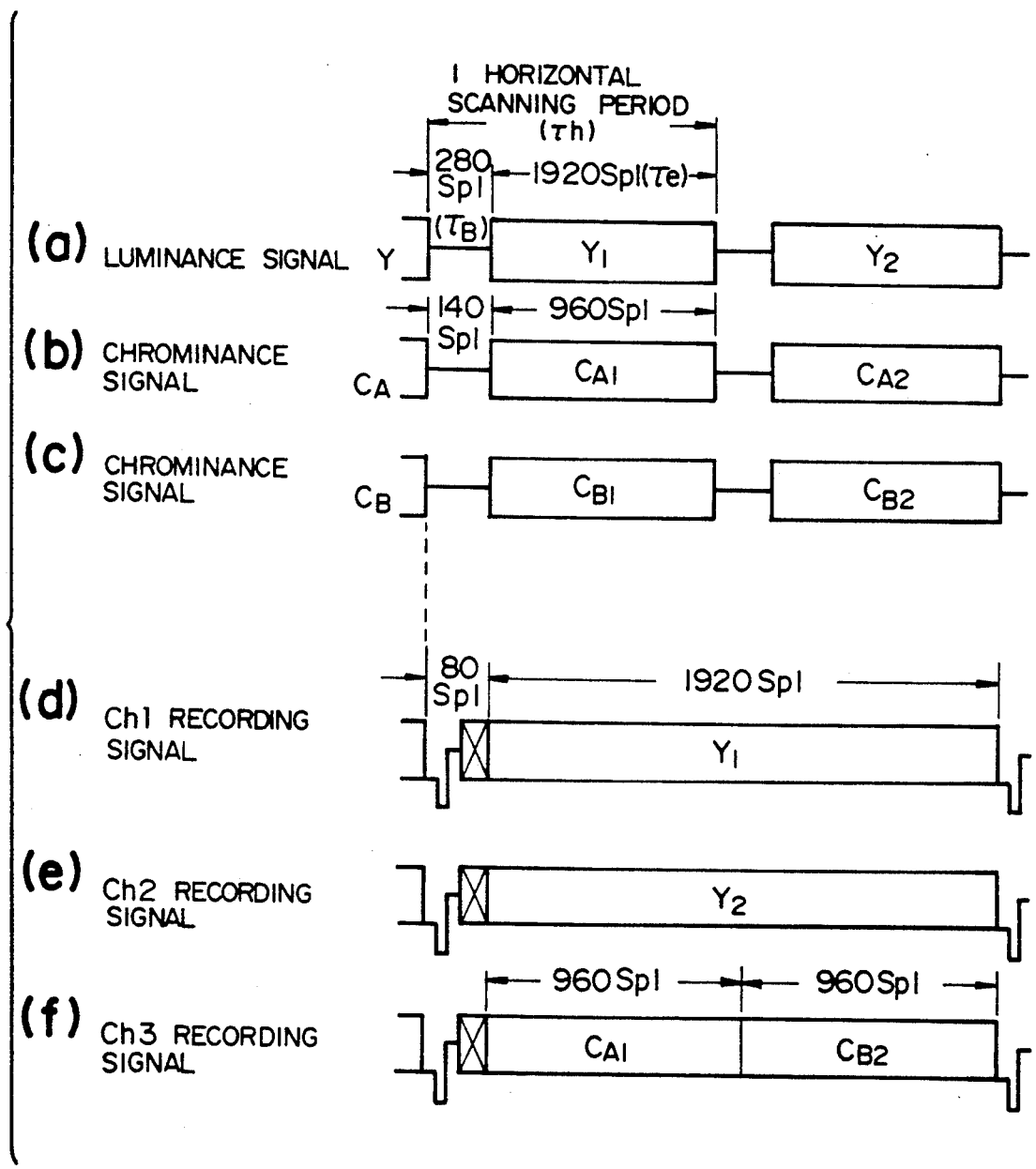
FIG. 12 is a diagram showing an input luminance signal and input chrominance signals and video signals to be recorded.

As a method of dividing the input video signal into a plurality of channels, there are considered various methods such as (1) method whereby the luminance signal and the chrominance signals are recorded into different channels, (2) method whereby the luminance signal and the chrominance signal are time division multiplexed and, further, divided into channels, (3) method whereby the input video signal is divided into three primary color signals of R, G, and B, and the like. It is an object of all of the above methods to narrow the occupied band of the video signal per channel and to improve the C/N ratio and the S/N ratio of the recording and reproducing systems. A practical method of dividing the input video signal into channels in the embodiment will now be described with reference to FIGS. 12 and 13. In FIG. 12, (a), (b), and (c) indicate three signals comprising the luminance signal Y and the chrominance signals $C_A$ and $C_B$ obtained from the input three primary color signals through the matrix circuit. (d), (e), and (f) indicate signals of the respective channels which are recorded onto the magnetic tape. First, (d) denotes the recording signal of the channel 1 (ch1) and shows the luminance signal of every other line from the luminance signal in the first effective line. (e) denotes the recording signal of the ch2 and shows the luminance signal of every other line from the luminance signal of the next line of the first effective line. (f) denotes the recording signal of the ch3 and shows the signal in which the chrominance signals $C_A$ and $C_B$ are time base multiplexed. That is, the signal $C_A$ is selected in the odd number designated lines from the first effective line and, on the other hand, the signal $C_B$ is selected in the even number designated lines. By using such a recording method, the chrominance signals become a line sequential chrominance signal and the resolution in the vertical direction is reduced into $\frac{1}{2}$. However, in correspondence to it, the resolutions in the vertical direction of the chrominance signals are previously suppressed by the vertical filter 15, thereby eliminating the unnaturality upon reproduction.

The sampling frequency of each signal in the above embodiment will now be described. The conditions to specify the sampling frequencies are set as follows. The number of effective pixels per line is set to 1920 in both of the 1125/60 and 1250/50 systems and the number of sample points per line is set to 2200 including the horizontal blanking period also. On the other hand, with respect to the chrominance signals, a visual influence on the resolution is smaller than that of the luminance signal. Therefore, the number of samples is set to ½ of that mentioned above; namely, 1100 samples per line. Among them, the number of effective samples is set to 960. When the sampling frequencies are calculated on the basis of the above conditions, in the case of the 1125/60 system, a sampling frequency $f_{SYA}$ of the luminance signal is equal to 74.25 MHz and a sampling frequency $f_{SCA}$ of the chrominance signal is equal to 37.125 MHz. On the other hand, in the case of the 1250/50 system, a sampling frequency $f_{SYB}$ of the luminance signal is equal to 68.75 MHz and a sampling frequency $f_{SCB}$ of the chrominance signal is equal to 34.375 MHz.

A frequency of the read clock from the memory in the case of producing the recording signals ((d) to (f) in FIG. 12) of the channels ch1 to ch3 is calculated. The condition to specify the frequency of the read clock is based on the number of clocks (the number of samples) per line of the recording signal. In the embodiment, the number of samples per line of the recording signal is set to total 2000 comprising 1920 samples as the number of effective samples and 80 samples as the number of samples of the horizontal blanking portion including the negative polarity sync signal and the burst signal. On the other hand, as shown in FIG. 12, the length of 1H of the recording signal is equal to the length of almost 2H of the original input video signal. The time of the effective portion in one field of the recording signal must be within 1/60 second, that is, 16.67 msec in the case of the 1125/60 system and within 1/50 second, namely, 20.0 msec in the case of the 1250/50 system. Further, to make the recording patterns of one track in the above two systems coincident and to make the occupied areas on the tape per pixel coincident, the read clock frequencies of the 1125/60 and 1250/50 systems are selected so as to be equal to the ratio of the field frequencies, namely, 60:50. Although there exist many combinations of the read clock frequencies which satisfy the above conditions, in the 1125/60 system, the sampling frequencies are selected so that the length of 1H of the recording signal is equal to the length of 2H of the input video signal. The length of 1H of the recording signal is set to 59.26 $\mu$sec which is twice as long as the length of 1H (=29.63 $\mu$sec) of the original input signal and comprises 2000 sampling points, so that the sampling frequency $f_{SA}$=33.75 MHz. On the other hand, as mentioned above, the sampling frequency $f_{SB}$ of the 1250/50 system is set to 28.125 MHz in correspondence to the relation of 60:50 with the sampling frequency 33.75 MHz of the 1125/60 system. When the length of 1H of the recording signal is calculated on the basis of the above sampling frequencies, as mentioned above, 1H=59.26 $\mu$sec for the 1125/60 system and 1H=71.11 $\mu$sec for the 1250/50 system. In the case of the 1250/50 system, the length of 1H of the recording signal is 2.22 times as long as the length of 1H=32.0 $\mu$sec of the original input video signal and the time base expansion ratio is larger by 2.22 times as compared with that of the original input video signal. This is because the numbers of effective lines in both of the 1125/60 and 1250/50 systems are fixedly set to 1080.

Figure 13:
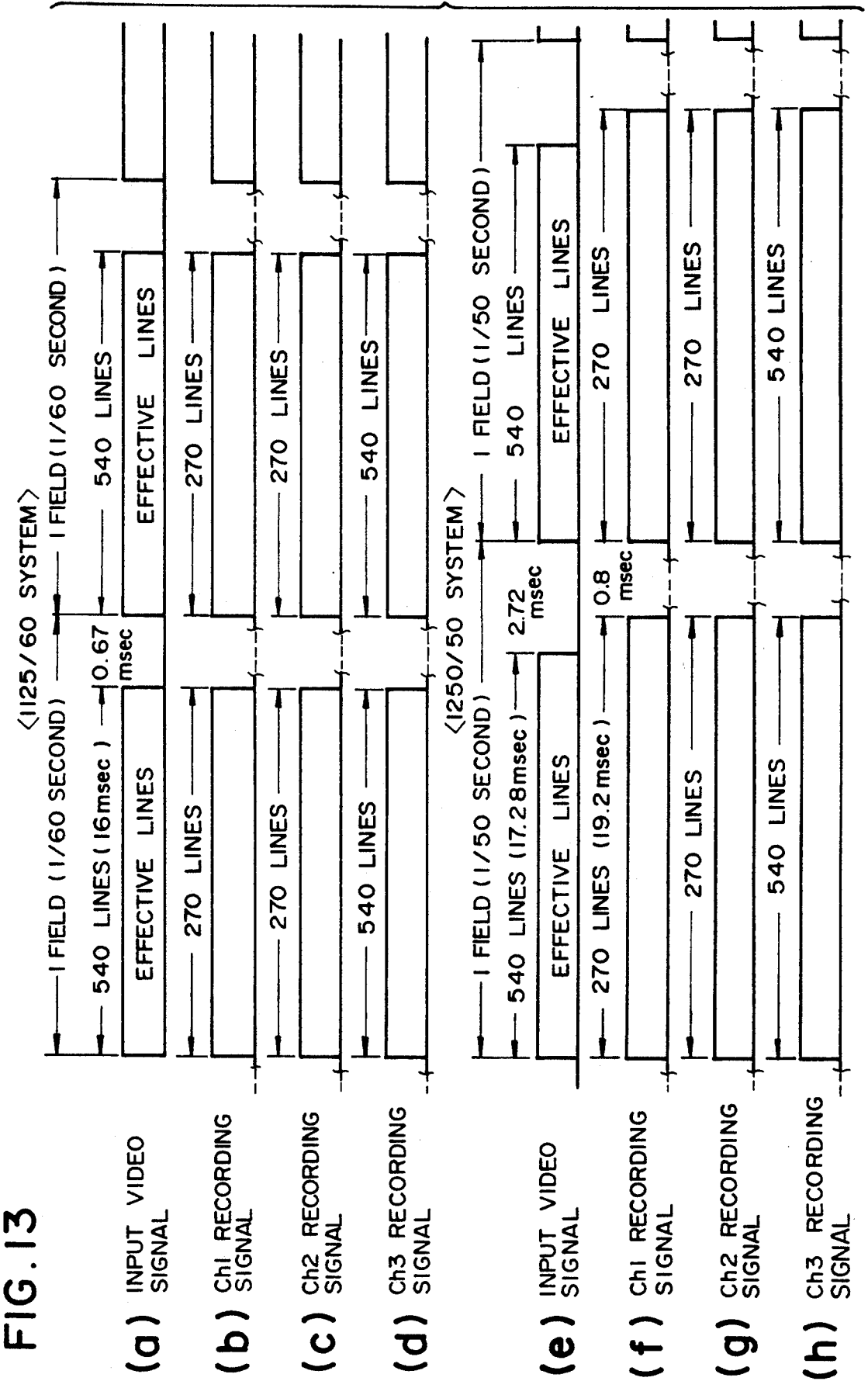
FIG. 13 is a diagram showing input video signals in one frame and video signals to be recorded.

A format of the recording signal per frame in each system will now be described with reference to FIG. 13. In FIG. 13, (a) shows the input video signal in the 1125/60 system and indicates the effective lines in one field, in other words, the lines to be recorded onto the recording medium. In the case of the embodiment, since the number of effective lines in one frame is set to 1080, the number of effective lines in one field is set to 540. (b), (c), and (d) show the recording signals of three channels from ch1 to ch3 and correspond to (d), (e), and (f) in FIG. 12, respectively. In this case, one field corresponds to 16.67 msec. In the time of one field, the occupied time of the effective lines is set to 16 msec and the vertical blanking period of time is set to 0.67 msec. The above time relation is also directly applied to the recording signal of each channel. For instance, in the recording signal of ch1 of (b), the number of effective lines per field is set to 270 and the occupied time of this portion is set to 16 msec and the occupied time of the other blanking portions is set to 0.67 msec. In FIG. 13, (e) shows the input video signal in the 1250/50 system, the occupied time of the 540 effective lines is set to 17.28 msec and the vertical blanking time is set to 2.72 msec. (f), (g), and (h) show the recording signals of ch1 to ch3 and there is the following time relation between the effective line portion and the blanking portion. As described above, in the recording signal of the 1250/50 system, the length of 1H is equal to 71.11 $\mu$sec. Therefore, as shown in (f), the time corresponding to 270 lines is equal to 19.2 msec. Therefore, the vertical blanking period of time is set to 0.8 msec. The unrecorded portion shown in FIG. 13 denotes the period of time when none of the magnetic heads 105, 106, and 107 is in contact with the magnetic tape 102. As shown in FIG. 13, by recording the unrecorded portion so as to be located in the vertical blanking period, it is possible to construct so as not to cause any signal drop in the effective line portion. Therefore, upon reproduction, by interpolating the vertical blanking portion, the original complete video signal can be obtained.

Figure 14:
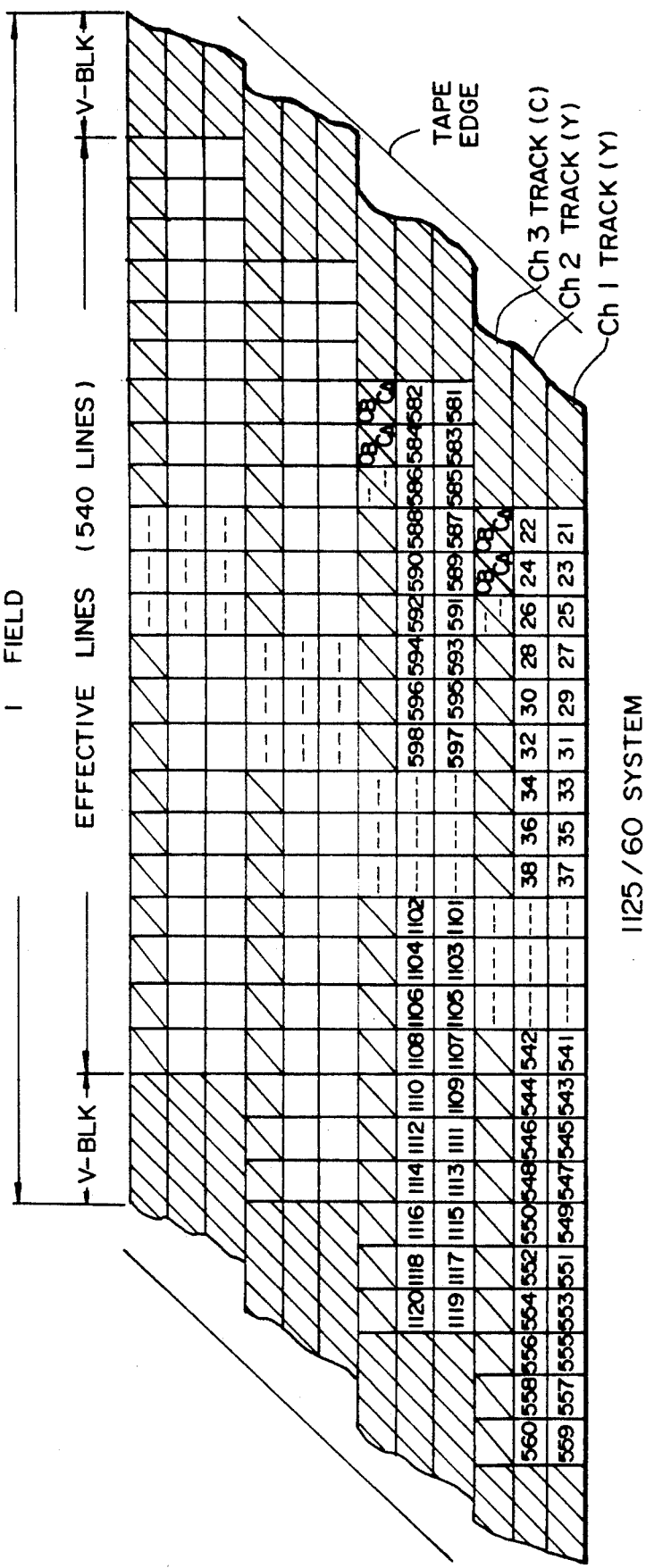
FIG. 14 is a diagram showing a recording pattern of the 1125/60 system.
Figure 15:
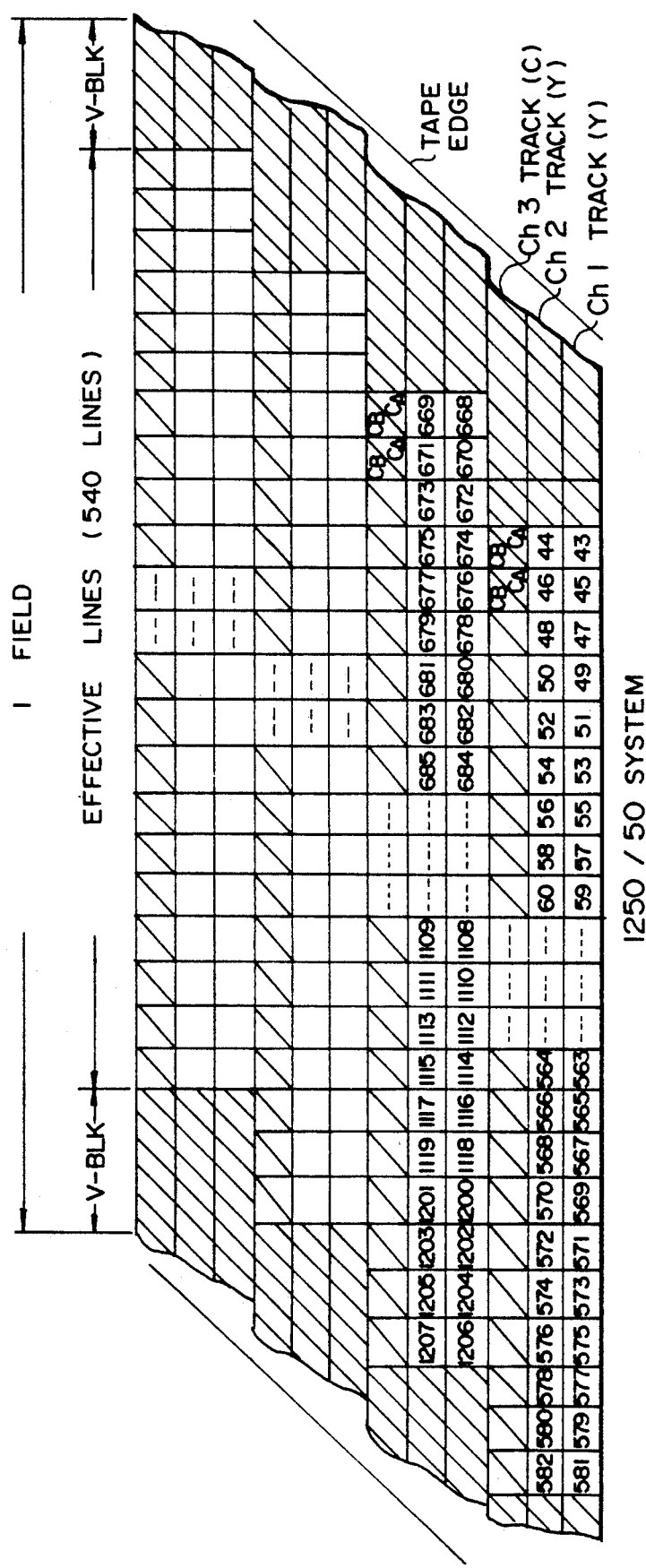
FIG. 15 is a diagram showing a recording pattern of the 1250/50 system.

FIGS. 14 and 15 are diagrams showing track patterns on the magnetic tape. FIG. 14 shows the track pattern of the 1125/60 system. FIG. 15 shows the track pattern of the 1250/50 system. On the other hand, the hatched portions in the diagram denote the portions other than the effective lines. The vertical blanking signal and the like are recorded in the hatched portions. The luminance signal is recorded in two tracks shown by ch1 track (Y) and ch2 track (Y). Numerical values shown in the diagrams indicate the line numbers. In FIG. 14, the signals of the lines of the numbers 21, 23, 25, ..., 557, and 559 are recorded in the ch1 track. The signals of the lines of the numbers 22, 24, 26, ..., 558, and 560 are recorded in the ch2 track. Two kinds of chrominance signals $C_A$ and $C_B$ are recorded in the ch3 track. As shown in (f) in FIG. 12, the chrominance signals $C_A$ and $C_B$ are time division multiplexed in 1H of the recording signal and the respective chrominance signals are line sequentially recorded. As mentioned above, in the embodiment, the signals of 540H of the effective lines in one field are recorded on three tracks of ch1 to ch3. In FIG. 14, the effective lines in the first field are constructed by the lines of the numbers 21 to 560 and the effective lines in the second field are constructed by the lines of the numbers 581 to 1120.

On the other hand, FIG. 15 shows the track pattern of the 1250/50 system. The number of effective lines in one field corresponds to 540 H. In the first field, the effective lines are constructed by the lines of the numbers 43 to 582. In the second field, the effective lines are constructed by the lines of the numbers 668 to 1207. On the other hand, with respect to the chrominance signals, in a manner similar to the case of FIG. 14, the chrominance signals $C_A$ and $C_B$ are line sequentially recorded in the ch3 track.

Figure 16:
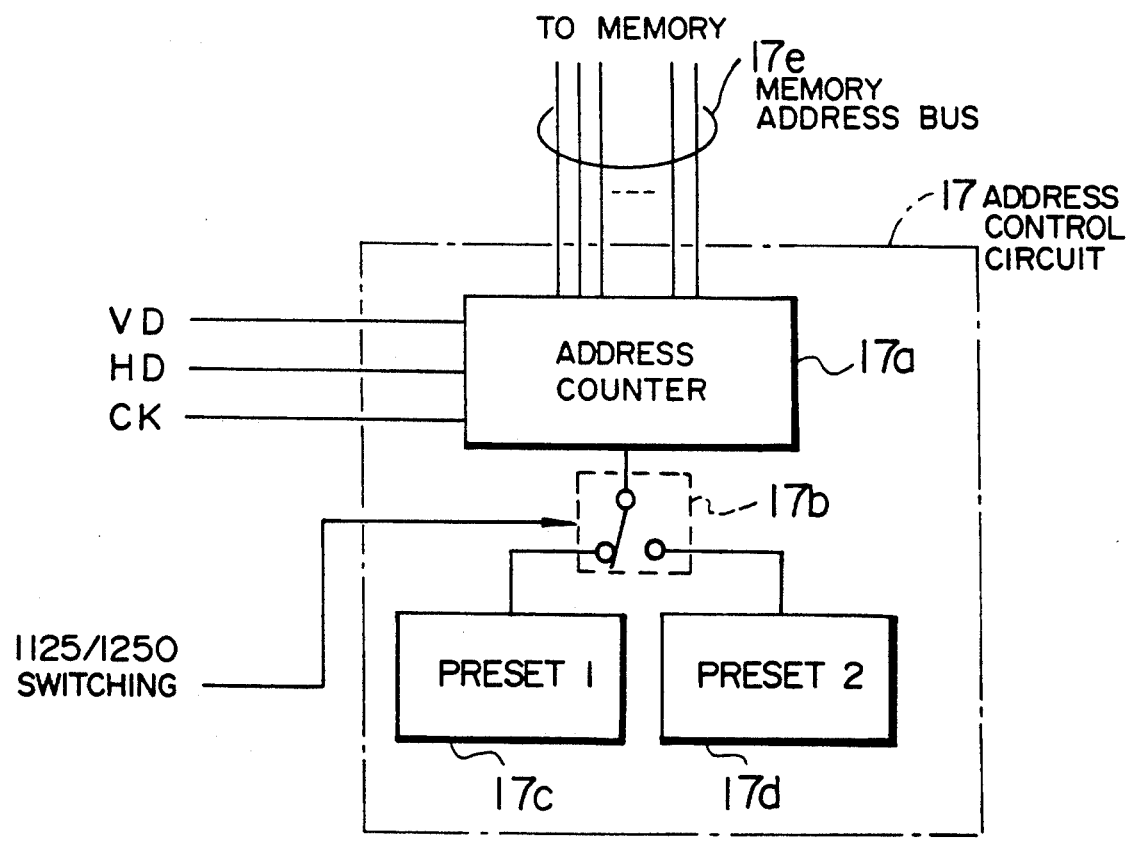
FIG. 16 is an internal construction diagram of an address control circuit.

FIG. 16 shows the address control circuit shown in the block diagram of FIG. 11. The address control circuit comprises an address counter 17a to produce memory addresses; a change-over switch 17b which is switched in accordance with the system of the input video signal; presetting circuits 1 and 2 (17c and 17d) each for giving a preset value of the counter; and a memory address bus 17e to give address information to the memory. A vertical sync signal VD, a horizontal sync signal HD, and a clock to make the counter operative which are produced by the control signal producing circuit 9 in FIG. 11 are input to the address counter 17a. On the basis of the above signals, the address counter 17a detects the start and end lines of the effective lines and transmits the detection information to the memory, thereby controlling the operation of the memory.

Figure 17:
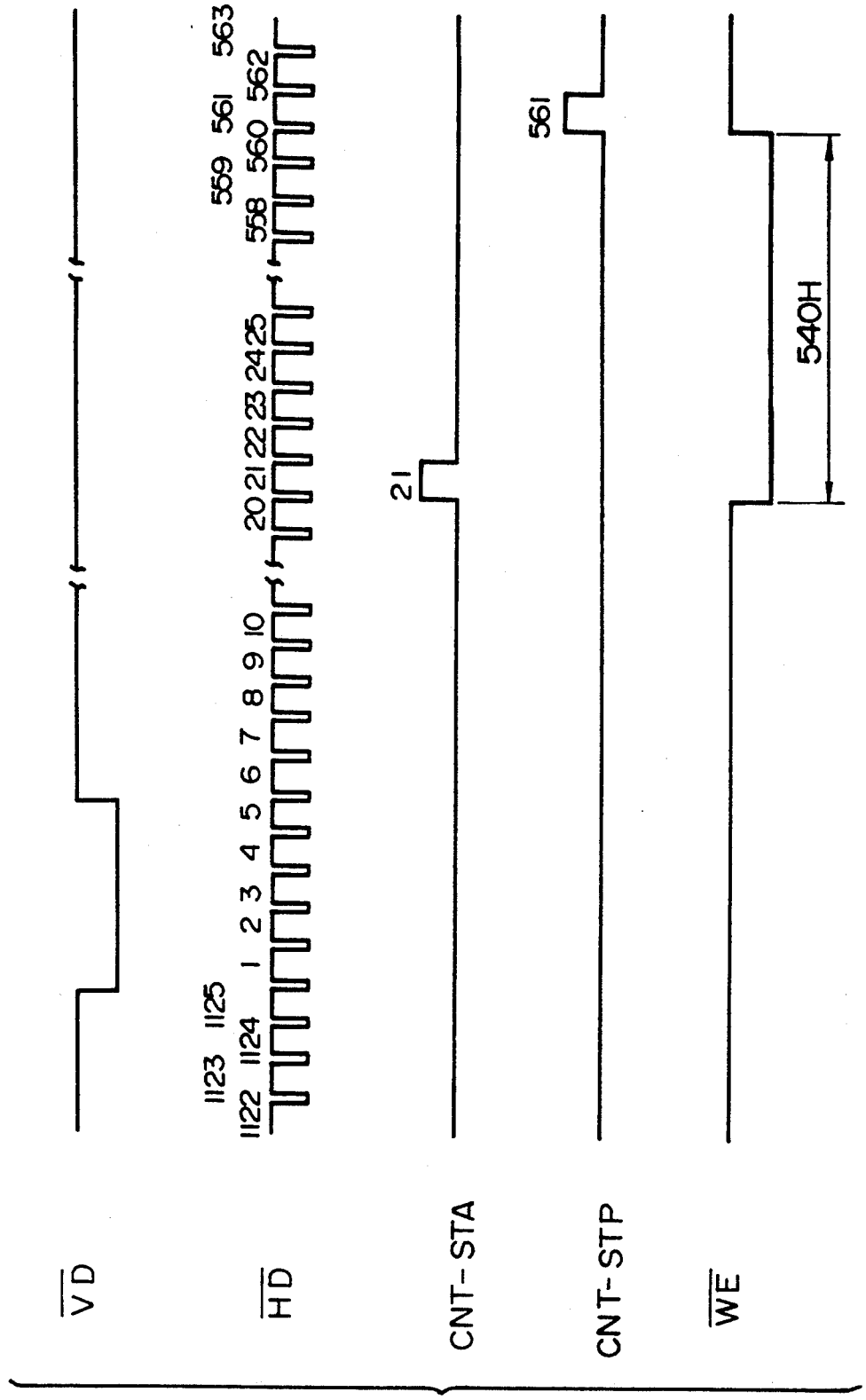
FIG. 17 is a timing chart for address control signals.

FIG. 17 is a timing chart showing an example of the operation of the address control circuit. First, $\overline{VD}$ denotes a vertical sync signal which was separated by the control signal producing circuit from the sync signal which had been input from the VTR. The vertical sync signal $\overline{VD}$ is used as a reference signal for the operation of the address counter. That is, the address counter is once reset by a trailing edge of the $\overline{VD}$. From the reset time point, the address counter starts to count the number of horizontal sync signals $\overline{HD}$ which were likewise separated by the control signal producing circuit. In the case of the input video signal of the 1125/60 system, since the effective line starts from the line of No. 21, as shown in FIG. 14 a CNT-STA (count start) pulse is raised at this time point. On the other hand, in the case of the input video signal of the 1250/50 system, since the effective line starts from the line of No. 43 as shown in FIG. 15, the CNT-STA pulse is raised at the line of No. 43. The start points of the effective lines are set by the presetting circuits 1 and 2 (17c and 17d) shown in FIG. 16. The presetting circuits are switched in accordance with the system of the input video signal. Then, the address counter 17a counts 540 lines as the number of effective lines in one field and produces a CNT-STP (count stop) pulse at the 561st line and stops operating. A write pulse ($\overline{WE}$) is set to the low level for the period of time of 540 H of the effective lines. The video signal is written into the memory in the above period of time. As mentioned above, the video signal can be written into the memory for any one of the 1125/60 and 1250/50 systems by changing the preset value of the address counter in correspondence to each system.

Figure 18A:
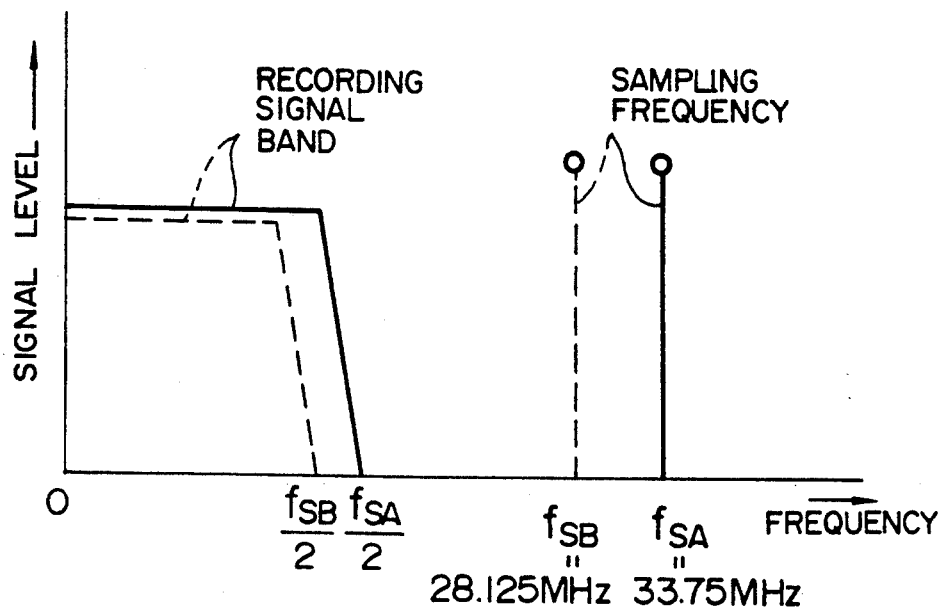
FIGS. 18A and 18B are diagrams showing frequency layouts of the signals in the sections.

The video signals which were once written into the memory as mentioned above are simultaneously read out from the three ports of ch1 to ch3. At this time, as mentioned above, the clock frequencies when reading the signals from the memory are such that $f_{SA}=33.75$ MHz for the 1125/60 system and $f_{SB}=28.125$ MHz for the 1250/50 system. The clock frequencies are set at a ratio of $f_{SA}/f_{SB}=60/50$. FIG. 18A shows such a state. In FIG. 18A, ordinate indicates the signal level and the abscissa represents the frequency. In FIG. 18A, a vertical solid line at the frequency $f_{SA}$ indicates a spectrum of the read clock from the memory for production of the recording signal in the 1125/60 system and a vertical broken line at the frequency $f_{SB}$ likewise shows a spectrum of the read clock from the memory in the 1250/50 system. On the other hand, a band shown by a solid line within a range from the frequency 0 to $f_{SA}/2$ indicates a band of the recording signal of the 1125/60 system. A band shown by a broken line within a range from the frequency 0 to $f_{SB}/2$ indicates a band of the recording signal of the 1250/50 system. The recording signal is obtained by D/A converting the digital data which was read out of the memory by the clocks of each of the frequencies $f_{SA}$ and $f_{SB}$. As shown in FIG. 18A, the occupied band is set to the band of ½ of each of the clock frequencies or lower.

Figure 18B:
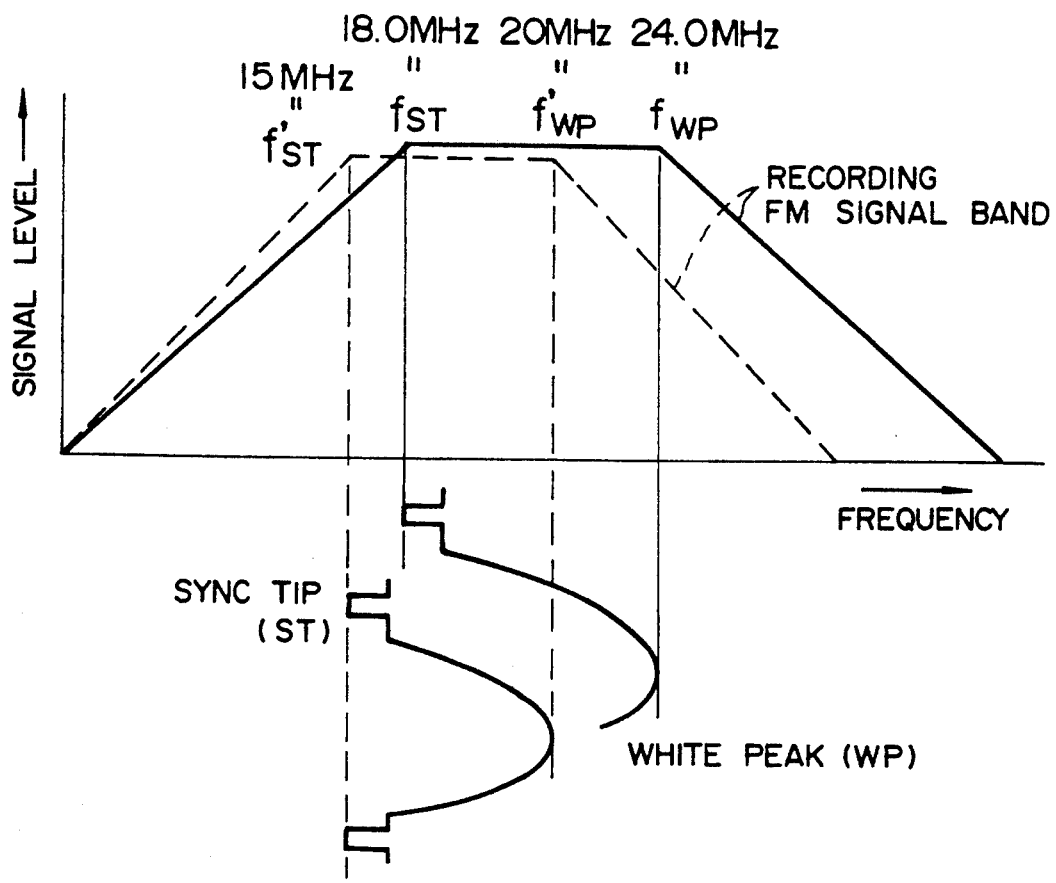

The recording signals obtained as mentioned above are frequency for every channel and recorded onto the magnetic tape. FIG. 18B is a diagram showing spectra of the frequency modulated recording signal. A trapezoid portion shown by a solid line in the diagram indicates the spectrum of the recording signal after the frequency modulation in the case of the 1125/60 system. A trapezoid portion shown by a broken line indicates the spectrum of the signal after the frequency modulation in the case of the 1250/50 system. In the diagram, a frequency shown by $f_{ST}=18$ MHz indicates a frequency corresponding to a sync tip signal of the recording signal of the 1125/60 system. A frequency shown by $f_{WP}=24.0$ MHz similarly indicates a frequency corresponding to a 100% white peak signal. Likewise, $f'_{ST}=15$ MHz indicates a frequency corresponding to the sync tip signal of the 1250/50 system and $f'_{WP}=20$ MHz indicates a frequency corresponding to the 100% white peak signal. In the embodiment, the above frequencies are selected so as to satisfy the following equation.

$$f'_{ST}/f_{ST}=f'_{WP}/f_{WP}=50/60$$

On the other hand, the rotational speed of the cylinder is determined in proportion to the field frequency. For instance, it is set to 3600 r.p.m. for the 1125/60 system and to 3000 r.p.m. for the 1250/50 system. Now, assuming that the relative speed between the heads and the tape is set to, e.g., 24 m/sec for the 1125/60 system when the cylinder diameter has a predetermined value, the relative speed in the case of the 1250/50 system is set to 20 m/sec corresponding to 50/60 of that of the 1125/60 system. Therefore, in any of the 1125/60 and 1250/50 systems, the wavelengths corresponding to each frequency are set to 1.33 μm in correspondence to the sync tip signal and 1.0 μm in correspondence to the 100% white peak signal. As mentioned above, in the case of recording the video signals of different systems, by properly selecting the frequency allocation of the frequency modulated signals, the recording wavelengths of the corresponding signals can be made coincident and the S/N ratio to the signal (for instance, a 50% gray signal) of the same level can be made constant irrespective of the system. On the other hand, at this time, in general, if the frequency allocation of the FM signal is set to a low frequency range, a moiré due to the interference with the original recording signal (of the base band) occurs and the like, so that it is disadvantageous from a viewpoint of the picture quality. However, in the embodiment, as shown in FIG. 18B, there is a feature such that in the 1250/50 system in which it is necessary to set the frequency allocation of the FM signal to a low frequency range, the band of the recording signal is lower than that of the 1125/60 system by only the ratio of the field frequencies and an interference between the FM signal and the recording signal of the base band does not occur.

As mentioned above, the signal in which the allocation of the FM signal was selected and which was recorded on the magnetic tape 102 is again reproduced from the magnetic tape 102 by the heads 105, 106, and 107 upon reproduction. The reproduced signals are then amplified to proper levels by a preamplifier 301. The reproduction signals which were output from the preamplifier 301 are frequency demodulated by a frequency demodulating circuit 302 and converted into the original signals of the base band. Thereafter, the signals are converted into the digital signals by an A/D converter 303 by using the clocks produced by the control signal producing circuit 208 on the basis of the sync signal separated by the sync separating circuit 204. The digital signals are once stored into the buffer memory 206. In the buffer memory, the video signals distributed to three channels of ch1 to ch3 are synthesized and are further time-base compressed, thereby producing the luminance signal data and the line sequential chrominance signal data. The luminance signal data 209 is directly input to the D/A converter 213. On the other hand, the line sequential chrominance signal data 210 is input to the data interpolating circuit 212 and is subjected to a line interpolating process and is converted into the original chrominance signal data. After that, it is input to the D/A converter 213. In the D/A converter 213, the luminance signal data and the chrominance signal data are converted into the original analog video signals (luminance signal Y 214 and chrominance signals $C_A$ 215 and $C_B$ 216). The luminance signal and chrominance signals which were obtained as mentioned above are input to the inverse matrix circuit 217 and are again converted into the three primary color signals of R 219, G 220, and B 221. At this time, the control signal producing circuit 208 receives the information to discriminate that the signal which is at present being reproduced is based on which one of the 1125/60 and 1250/50 systems through the terminal 10 and produces the clocks corresponding to each system, thereby allowing the signal of each system to be reproduced. On the other hand, the sync producing circuit 218 also receives the information to discriminate the system and information from the control signal producing circuit 208 and produces a sync signal corresponding to each system synchronously with the reproduction video signal.

As described above, in the embodiment, each section of the VTR is made operative in accordance with the system of the video signal which is recorded or reproduced and the video signal of any system can be recorded or reproduced. Further, even if the systems of the video signals differ, the number of effective lines is set to be constant irrespective of the system and the numbers of effective pixels (the numbers of samples) per line are also made coincident and the signals are recorded. Thus, the recording patterns on the tape can be made almost coincident even for the video signals of different systems. On the other hand, by changing the frequency allocation of the recording FM signal in correspondence to the relative speed between the tape and the heads which changes in proportion to the field frequency and by recording the FM signal, the recording wavelengths of the video signals of different systems can be made coincident. A reproduction image of a predetermined picture quality (S/N ratio) can be always obtained.

In the above embodiment, a condition that the numbers of effective lines for a plurality of video signals of different systems are made coincident is used as a prerequisite. However, the essence of the invention is not limited to only the above case. That is, when a plurality of video signals of different systems have effective lines of different numbers, the number of effective lines in the system having a larger number of effective lines among them is set to N (N is a natural number) and the number of effective lines of the system having a smaller number of effective lines is set to n (n is a natural number and N>n). In such a case, the number of lines which are recorded to the recording medium is set to at least N and the signal is recorded. At this time, when recording the video signal of n effective lines, a space occurs in only the (N−n) recording lines. However, a black signal or other information is recorded in such a space portion, thereby making the numbers of recording lines on one track in the plurality of systems coincident. By recording by the above method, the recording patterns on the recording medium can be made almost coincident irrespective of the system of the input video signal and the essence of the invention is satisfied.

On the other hand, in the above example, conversely, the number of lines which are recorded to the recording medium can be also set to n. In this case, in the system of N effective lines, a signal drop occurs in only (N-n) effective lines, so that the (N-n) lines result in the black signal or the like. However, as compared with the original N lines, if the number of dropped lines, that is, N-n is about a few percent, in general, such a signal drop of the (N-n) lines hardly practically causes a problem due to the overscan on the display. That is, as mentioned above, the essence of the invention can be accomplished by making the numbers of effective lines which are recorded onto the recording medium coincident even if the numbers of effective lines in the video signals of a plurality of systems differ.

On the other hand, the invention is not limited to the foregoing example but the object of the invention such that the hardwares to execute the signal processes are commonly constructed can be accomplished even in the case where the numbers of effective lines which are recorded differ for every system. For instance, it is now assumed that the number of effective lines in the 1125/60 system is preset to 1080 and the number of effective lines in the 1250/50 system is preset to 1150. In such a case, for instance, the capacity of the buffer memory is predetermined to a capacity which can be applied to the system having a larger number of effective lines. That is, if the capacity of one frame is needed as a memory capacity, even the VTR adapted to the 1125/60 system is constructed so as to have the capacity corresponding to 1150 lines as a memory capacity. With such a construction, there is an advantage such that the apparatus can cope with the 1250/50 system without largely changing the hardware. According to the recording and reproducing method of the invention, there is a feature such that the hardware can be commonly constructed even in the case where the numbers of effective lines which are recorded onto the recording medium differ depending on the system.

Although the above two embodiments have been described with respect to the example in which the signal is divided into segments instead of dividing into channels and the example in which the signal is not divided into segments but is divided into three channels, respectively, the applicable range of the invention is not limited to those examples. The invention can be also applied to an apparatus in which the channel division and the segment division are used, for instance, to a VTR by the 2-channel division and 3-segment recording method.

On the other hand, when the recording time of the VTR is made long, there is a case of using a technique such as line thinning-out, pixel thinning-out (dot thinning-out), or the like. Even in the above two embodiments, the line thinning-out process has already been executed by processing the chrominance signals to obtain a line sequential chrominance signal. However, the invention can be also applied even to the recording and reproducing method using the signal thinning-out or compressing technique as mentioned above. For instance, in a system in which a process such as pixel thinning-out or the like is executed when recording a video signal of the system in which the number of effective lines is set to 1080 and the number of lines which are recorded onto the recording medium is equivalently set to 540 as ½ or 1080 lines, when the video signals of different systems are input, the above pixel thinning-out process is similarly executed irrespective of the system of the video signal. If the numbers of effective lines to be recorded are equal even in any systems, the invention can be applied and the effects similar to those in the case where the compressing technique is not used can be obtained.

On the other hand, in the above two embodiments, only the two systems of 1125/60 and 1250/50 have been described as systems of the input video signals. However, the invention is not limited to the above two systems but can be also applied to video signals of different systems in which the numbers of scanning lines and the field frequencies are different from those in the above two systems. On the other hand, in the above embodiments, the VTR of the analog (FM) recording system has been described as a practical construction. However, the invention is not limited to only such an analog recording type VTR but can be also applied to a digital VTR in which the video signal is recorded as a digital signal. In such a case, by constructing the VTR in a manner such that not only the numbers of lines per track but also the numbers of pixels are made coincident and the signals are recorded and by executing the recording, the recording wavelength per pixel can be made constant irrespective of the system. The effect such that the same picture quality is obtained can be also derived in a manner similar to the case of the analog VTR.

Further, the invention is not limited to only the VTR as mentioned above but can be also applied to the whole video signal recording and reproducing apparatus such as a video disk player (VDP) and the like using a rotational disk as a recording medium. The effect of the invention such that a predetermined picture quality can be obtained irrespective of the system can be similarly derived.

As described above, according to the invention, when recording video signals of a plurality of systems in which the field frequencies and the numbers of scanning lines are different, by making the numbers of recording effective lines in the plurality of systems coincident and, further, by making the numbers of effective pixels per line coincident, it is possible to cope with the video signals of a plurality of systems without changing the constructions of the signal processing system and mechanism in the recording and reproducing apparatus. On the other hand, by changing the frequency of the recording signal in proportion to the relative speed between the recording medium and the recording or reproducing scanner which changes in accordance with the field frequency in addition to the above method, even if the video signals of different systems were recorded, the area which is occupied by one line and, further, by one pixel on the recording medium can be made constant. Therefore, the video signals of a plurality of different kinds of systems can be recorded by the recording and reproducing apparatus having an equivalent fundamental construction. The costs and the period of development time of the apparatus can be reduced. Further, even in the case where the video signals of different systems were recorded, the recording patterns on the recording medium can be made almost coincident and the equal picture quality can be obtained.

The present invention can be also embodied in the other forms of the above embodiments without departing from the spirit and main features of the invention. Therefore, the above embodiments are nothing but mere examples of the invention with respect to all of the points. The scope of the invention is shown by the scope of the appended claims. Further, all of modifications and variations which belong to the equivalent scope of the claims are within the purview of the invention.

What is claimed is:

1. A video tape apparatus comprising:

means for receiving a first analog video signal of a television system selected from a plurality of television systems having mutually different numbers of scanning lines per frame, the first analog video signal including a plurality of scanning line periods per frame period, each of the scanning line periods including an effective video period and a horizontal blanking period;

means for receiving a signal indicative of the selected television system;

means for generating at least one write clock signal and a read clock signal having respective frequencies determined on the basis of the signal indicative of the selected television system;

means for sampling the first analog video signal in response to the at least one write clock signal and converting the sampled first analog video signal into a first digital video signal including the plurality of scanning line periods per frame period, each of the scanning line periods including the effective video period and the horizontal blanking period;

buffer memory receiving the first digital video signal;

means for controlling the buffer memory to store the effective video period of each of a predetermined number of scanning line periods per frame period selected from the plurality of scanning line periods per frame period of the first digital video signal in response to the at least one write clock signal and the signal indicative of the selected television system, and controlling the buffer memory to read out of the stored effective video period of each of the predetermined number of scanning line periods per frame period in response to the read clock signal to produce a second digital video signal, wherein the predetermined number of scanning line periods per frame period is the same regardless of the number of scanning lines per frame in the selected television system;

means for converting the second digital video signal into a second analog video signal in response to the read clock signal;

means for frequency-modulating the second analog video signal in a frequency band having a minimum frequency and a maximum frequency determined on the basis of the signal indicative of the selected television system to produce a frequency-modulated analog video signal;

means for amplifying the frequency-modulated analog video signal to produce a video recording signal;

a rotary cylinder;

a plurality of magnetic heads mounted on the rotary cylinder and receiving the video recording signal; and means for controlling the rotary cylinder to cause the plurality of magnetic heads to record the video recording signal on a magnetic tape in accordance with a helical scanning method.

2. A video tape apparatus according to claim 1, wherein the buffer memory controlling means controls the buffer memory to read out the stored effective video period of each of the predetermined number of scanning line periods per frame period in response to the read clock signal as a plurality of segment signals each including a predetermined number of the predetermined number of scanning line periods per frame period, thereby producing the second digital video signal, wherein the predetermined number of the predetermined number of scanning line periods per frame period is the same regardless of the number of scanning lines per frame in the selected television system.

3. A video tape apparatus according to claim 1, wherein the respective frequencies of the at least one write clock signal generated by the clock signal generating means are determined on the basis of the signal indicative of the selected television system such that the sampling and converting means samples the first analog video signal in response to the at least one write clock signal a predetermined number of times during the effective video period of each of the scanning line periods per frame period of the first analog video signal, wherein the predetermined number of times is the same regardless of the selected television system.

4. A video tape apparatus according to claim 1, wherein the frame period of the first analog video signal is indicative of a frame frequency of the first analog video signal, wherein the rotary cylinder controlling means includes a servo control circuit for controlling a rotational speed and a phase of the rotary cylinder, and wherein the servo control circuit changes the rotational speed of the rotary cylinder in proportion to the frame frequency of the first analog video signal.

5. A video tape apparatus according to claim 1, wherein the frame period of the first analog video signal is indicative of a frame frequency of the first analog video signal, and wherein the frequency-modulating means changes the minimum frequency and the maximum frequency of the frequency band in proportion to the frame frequency of the first analog video signal on the basis of the signal indicative of the selected television system.

6. A video tape apparatus according to claim 1, further comprising:

means for controlling the rotary cylinder to cause the plurality of magnetic heads to reproduce the video recording signal recorded on the magnetic tape in accordance with a helical scanning method to produce a video reproduction signal;

means for amplifying the video reproduction signal to produce an amplified video reproduction signal;

means for frequency-demodulating the amplified video reproduction signal to produce a third analog video signal including the predetermined number of scanning line periods per frame period, each of the scanning line periods including the effective video period;

means for generating a write clock signal and at least one read clock signal having respective frequencies determined at least on the basis of the signal indicative of the selected television system;

means for sampling the third analog video signal in response to the write clock signal and converting the sampled third analog video signal into a third digital video signal including the predetermined number of scanning line periods per frame period, each of the scanning line periods including the effective video period;

a buffer memory receiving the third digital video signal;

means for controlling the buffer memory to store the effective video period of each of the predetermined number of scanning line periods per frame period of the third digital video signal in response to the write clock signal, and controlling the buffer memory to read out the stored effective video period of each of the predetermined number of scanning line periods per frame period in response to the at least one read clock signal and the signal indicative of the selected television system to produce a fourth digital video signal including the predetermined number of scanning line periods, each of the scanning line periods including the effective video period and the horizontal blanking period;

means for converting the fourth digital video signal into a fourth analog video signal in response to the at least one read clock signal; and means for outputting the fourth analog video signal as an analog video signal of the selected television system.

* * * * *

UNITED STATES PATENT AND TRADEMARK OFFICE
CERTIFICATE OF CORRECTION

PATENT NO. :  5,239,381
DATED     :  August 24, 1993
INVENTOR(S) :  Takahashi et al.

It is certified that error appears in the above-identified patent and that said Letters Patent is hereby corrected as shown below:

On the title page of the patent, under "United States Patent", "Takahashi" should be -- Takahashi et al. --.

On the title page of the patent, item [75] relating to the inventorship should read as follows:

-- Inventors:    Hiroaki Takahashi, Yokohama, Japan;
                 Takashi Furuhata, Kamakura, Japan --

Signed and Sealed this

Seventeenth Day of May, 1994

Attest:

BRUCE LEHMAN

*Attesting Officer*         *Commissioner of Patents and Trademarks*